United States Patent
Castro Castro

(10) Patent No.: US 9,986,103 B2
(45) Date of Patent: May 29, 2018

(54) ADVANCED POLICY AND CHARGING CONTROL METHODS, NETWORK NODES AND COMPUTER PROGRAMS FOR SPONSORED DATA CONNECTIVITY BY PEERS

(71) Applicant: Telefonaktiebolaget L M Ericsson (publ), Stockholm (SE)

(72) Inventor: Fabian Castro Castro, Arillo/Oleiros/A Coruña C.P. (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 14/891,478

(22) PCT Filed: May 17, 2013

(86) PCT No.: PCT/EP2013/060254
§ 371 (c)(1),
(2) Date: Nov. 16, 2015

(87) PCT Pub. No.: WO2014/183796
PCT Pub. Date: Nov. 20, 2014

(65) Prior Publication Data
US 2016/0134760 A1    May 12, 2016

(51) Int. Cl.
*H04M 15/08*     (2006.01)
*H04L 12/14*     (2006.01)
(Continued)

(52) U.S. Cl.
CPC ........ *H04M 15/08* (2013.01); *H04L 12/1407* (2013.01); *H04L 12/1478* (2013.01);
(Continued)

(58) Field of Classification Search
CPC ....................................................... H04W 4/24
See application file for complete search history.

(56) References Cited

U.S. PATENT DOCUMENTS

2004/0029561 A1   2/2004  Holter et al.
2009/0207757 A1*  8/2009  Andreasen .......... H04L 12/1403
                                                370/254
(Continued)

FOREIGN PATENT DOCUMENTS

WO    WO 2010/133251 A1    11/2010
WO    WO 2012/021344 A2    2/2012

OTHER PUBLICATIONS

PCT Notification of Transmittal of the International Search Report and the Written Opinion of the International Searching Authority, or the Declaration for International application No. PCT/EP2013/060254, Jul. 24, 2013.

(Continued)

*Primary Examiner* — Vladimir Magloire
*Assistant Examiner* — Ernest Tacsik
(74) *Attorney, Agent, or Firm* — Baker Botts, LLP

(57) ABSTRACT

In a method for providing a service requiring data connectivity between at least two user terminals (100, 500), a first PCRF (400) determines (s20) that there is no available data quota associated with a first user terminal (500) for the data connectivity required for the service to be provided. The first PCRF (400) notifies (s30) an AF (300) about the determination, which in turns notifies (s40) an application service provider (200). The application service provider (200) requests (s50) a second user terminal (100) to sponsor the data connectivity of the first user terminal (500) so as to permit the data connectivity required for the service to be provided. The invention also relates to network nodes for participating in providing such services, and to user terminals and computer programs.

15 Claims, 10 Drawing Sheets

(51) Int. Cl.
 H04M 15/00 (2006.01)
 H04W 4/24 (2018.01)
(52) U.S. Cl.
 CPC ............ *H04M 15/66* (2013.01); *H04W 4/24* (2013.01); *H04M 2215/0192* (2013.01); *H04M 2215/62* (2013.01)

(56) References Cited

U.S. PATENT DOCUMENTS

2014/0237081 A1* 8/2014 Zhu ................ H04L 67/327
  709/219
2015/0044989 A1* 2/2015 De Foy ............ H04L 12/1478
  455/406

OTHER PUBLICATIONS

3GPP TSG-SA WG1 #59; Chicago, USA; Title: Support for Service Sharing in MOSAP; Source: InterDigital Communications (S1-122356), Jul. 30-Aug. 3, 2012.
3GPP TS 23.203 v11.5.0; Technical Specification; 3rd Generation Partnership Project; Technical Specification Group Services and System Aspects; Policy and charging control architecture (Release 11), Mar. 2012.
3GPP TS 23.203 v11.8.0; Technical Specification; 3rd Generation Partnership Project; Technical Specification Group Services and System Aspects; Policy and charging control architecture (Release 11), Dec. 2012.

* cited by examiner

US 9,986,103 B2

ADVANCED POLICY AND CHARGING CONTROL METHODS, NETWORK NODES AND COMPUTER PROGRAMS FOR SPONSORED DATA CONNECTIVITY BY PEERS

PRIORITY

This nonprovisional application is a U.S. National Stage Filing under 35 U.S.C. § 371 of International Patent Application Serial No. PCT/EP2013/060254, filed May 17, 2013, and entitled "Advanced Policy And Charging Control Methods, Network Nodes And Computer Programs For Sponsored Data Connectivity By Peers."

TECHNICAL FIELD

The present invention relates to methods carried out in a telecommunication network involving network nodes of a policy and charging control (PCC) architecture, for providing a service requiring data connectivity between at least two user terminals. The invention also relates to network nodes in a PCC architecture, for participating in providing such services, and to computer programs therefor.

BACKGROUND

In communication networks, such as telecommunication networks, a call or a service often involves, on the one hand, a control plane or signalling plane and, on the other hand, a user plane or media plane. The control plane or signalling plane is concerned with connection management. The user plane or media plane is mainly in charge of transporting the user data.

In this context, network operators often want to define and enforce a set of rules in the network. A set of rules constitutes policies. A policy framework for managing and enforcing these policies usually includes at least three elements, or functions: a policy repository for storing the policy rules, which may be user-specific, a policy decision element, function or point, and a policy enforcement element, function or point. The purposes of a policy framework include controlling subscriber access to the networks and services.

A policy framework notably addresses the decisions as to whether the subscriber, i.e. the user, is entitled, or authorized, to enjoy a service, and whether the network can provide the service to the subscriber (and, possibly, with which quality of service).

PCC architectures, such as, but not limited to, the architecture described in "3GPP TS 23.203 V11.9.0 (2013-03); Technical Specification; 3rd Generation Partnership Project; Technical Specification Group Services and System Aspects; Policy and charging control architecture (Release 11)" (available from 3gpp.org) (Hereinafter referred to as "reference [1]"), integrate the policy and charging control.

In such a PCC architecture, the policy and charging rules function (PCRF) is a functional entity in charge of deciding charging, policies and quality of service (QoS) for services of a given user. The PCRF may for example decide the quality of the connection to be allocated for voice, video, etc., which results, for example, on the establishment of dedicated bearer(s) with guaranteed bit rate (GBR) or non-guaranteed bit rate (non GBR). The PCRF may also make decisions about packet forwarding treatment in the radio access network (RAN) by means of determining the QoS class identifier (QCI). The PCRF may also decide, at the packet core control plane, the priority of a bearer to be established over other bearers, for the same or different users. Based on the above decisions by the PCRF. PCC rules may be generated and than installed in a policy and charging enforcement function (PCEF) of the PCC architecture, so that each service is given the appropriate treatment that the service requires. Installing PCC rules from the PCRF in the PCEF may include the PCRF generating the PCC rules, downloading and activating said PCC rules to the PCEF, or may include activating, from the PCRF, indicated PCC rules configured in the PCEF.

It is known to let a service provider sponsor the data connectivity of a user with a limited data plan, in order to allow the user to access the service provider's services (see reference [1], Annex N, "PCC usage for sponsored data connectivity"; and document S2-095087, "Policy enhancement for dynamic data usage", 3GPP TSG SA WG2 Meeting #75, 31 Aug.-4 Sep. 2009, Kyoto, Japan).

The prior art also includes WO 2010/133251 A1, relating to a method of operating an IP Multimedia Subsystem Application Server to facilitate a communication session between a first and second user at a required QoS. A notification is received that a PCRF associated with the first user has not authorised the required QoS. An authorisation is then requested, from a PCRF associated with the second user, for an additional QoS for the first user, and a notification is received that the PCRF associated with the second user has authorised the additional QoS. Eventually, the PCRF associated with the first user is notified that the additional QoS has been authorised for the first user. As a result, a session communication between the first and second user can be successfully established even if the QoS available to the first user is insufficient/inadequate for a particular session.

It is desirable to improve PCC architectures, notably by facilitating the provisions of services requiring data connectivity between users, especially between users with limited data plans, without increasing, or at least without excessively increasing, the implementation and architecture complexity and the associated equipment costs.

SUMMARY

To meet or at least partially meet the above-mentioned goals, methods, network nodes, user terminals, computer programs, computer program products and storage mediums according to the invention are defined in the independent claims. Particular embodiments are defined in the dependent claims.

In one embodiment, a method enables the provision of a service requiring data connectivity between at least two user terminals comprising a first user terminal and a second user terminal. The method comprises a determining procedure, a first notifying procedure, a second notifying procedure, and a requesting procedure. The determining procedure comprises determining, by a network node hosting a policy and charging rules function, said network node being hereinafter referred to as "first PCRF", that there is no available data quota associated with the first user terminal for the data connectivity required for the service to be provided. The first notifying procedure comprises notifying, by the first PCRF, a network node hosting an application function, said network node being hereinafter referred to as "AF", about the determination. The second notifying procedure comprises notifying, by the AF, an application service provider (ASP), about the determination. Then, the requesting procedure comprises requesting, by the ASP, to the second user terminal, to sponsor the data connectivity of the first user terminal so as to permit the data connectivity required for the service to be provided.

Thus, the method addresses a situation wherein there is no available data quota associated with the first user terminal for the data connectivity required for a service to be provided, for example (i) because the remaining data quota of the first user terminal is insufficient for providing the service, or (ii) because the first user terminal has no data plan (and thus no data quota). In such a situation, the second user terminal may sponsor the data connectivity of the first user terminal so that the desired service can be provided between the first and second user terminal.

In one embodiment, a network node hosting a PCRF participates in providing a service requiring data connectivity between at least two user terminals comprising a first user terminal and a second user terminal. The network node comprises a determining unit, a notifying unit, and a receiving unit. The determining unit is configured for determining that there is no available data quota associated with the first user terminal for the data connectivity required for the service to be provided. The notifying unit is configured for notifying another network node hosting an application function, said network node being hereinafter referred to as "AF", about the determination made by the determining unit. The receiving unit is configured for receiving, from the AF, a message comprising: (a) an identifier of the second user terminal sponsoring the data connectivity of the first user terminal; (b) an identifier of the sponsored service; and (c) a sponsored data amount.

In one embodiment, a network node hosting an application function participates in providing a service requiring data connectivity between at least two user terminals comprising a first user terminal and a second user terminal. The network node comprises a first receiving unit, a first sending unit, a second receiving unit, a second sending unit, a third receiving unit, and a third sending unit. The first receiving unit is configured for being notified, by a network node hosting a policy and charging rules function, said network node being hereinafter referred to as "first PCRF", about a determination that there is no available data quota associated with the first user terminal for the data connectivity required for the service to be provided. The first sending unit is configured for notifying an ASP about the determination. The second receiving unit is configured for receiving, from the ASP, a first sponsoring message, comprising: (a) an identifier of the second user terminal sponsoring the data connectivity of the first user terminal; and (b) an identifier of the sponsored service. The second sending unit is configured for sending, to a network node hosting another policy and charging rules function, said network node being hereinafter referred to as "second PCRF", a second sponsoring message comprising an identifier of the sponsored service. The third receiving unit is configured for receiving, from the second PCRF, a third sponsoring message comprising a sponsored data amount. The third sending unit is configured for sending, to the first PCRF, a fourth sponsoring message comprising (a) an identifier of the second user terminal sponsoring the data connectivity of the first user terminal, (b) an identifier of the sponsored service; and (c) the sponsored data amount.

In one embodiment, a network node hosting a policy and charging rules function participates in providing a service requiring data connectivity between at least two user terminals comprising a first user terminal and a second user terminal. The network node comprises a receiving unit and a sending unit. The receiving unit is configured for receiving, from a network node hosting an application function, a so-called second sponsoring message comprising an identifier of a sponsored service.

The sending unit is configured for sending, to the network node hosting the application function, a so-called third sponsoring message comprising a sponsored data amount.

In one embodiment, a user terminal, hereinafter referred to as "second user terminal", participates in providing a service requiring data connectivity between the second user terminal and at least one other user terminal, hereinafter referred to as "the at least one peer user terminal". The second user terminal comprises a receiving unit and a sending unit. The receiving unit is configured for receiving, from an ASP, a request to sponsor the data connectivity of one of the at least one peer user terminal, namely the data connectivity of a so-called first user terminal, so as to permit the data connectivity required for the service to be provided. The sending unit is configured for indicating, to the ASP, that the second user terminal agrees to sponsor the data connectivity of the first user terminal so as to permit the data connectivity required for the service to be provided.

In one embodiment, a method is carried out by a network node hosting a policy and charging rules function, for participating in providing a service requiring data connectivity between at least two user terminals comprising a first user terminal and a second user terminal. The method comprises a determining procedure, a notifying procedure, and a receiving procedure. The determining procedure comprises determining that there is no available data quota associated with the first user terminal for the data connectivity required for the service to be provided. The notifying procedure comprises notifying another network node hosting an application function, said network node being hereinafter referred to as "AF", about the determination. The receiving procedure comprises receiving, from the AF, a message comprising (a) an identifier of the second user terminal sponsoring the data connectivity of the first user terminal; (b) an identifier of the sponsored service; and (c) a sponsored data amount.

In one embodiment, a method is carried out by a network node hosting an application function for participating in providing a service requiring data connectivity between at least two user terminals comprising a first user terminal and a second user terminal. The method comprises a first receiving procedure, a first sending procedure, a second receiving procedure, a second sending procedure, a third receiving procedure, and a third sending procedure. The first receiving procedure comprises being notified, by a network node hosting a policy and charging rules function, said network node being hereinafter referred to as "first PCRF", about a determination that there is no available data quota associated with the first user terminal for the data connectivity required for the service to be provided. The first sending procedure comprises notifying an ASP about the determination. The second receiving procedure comprises receiving, from the ASP, a first sponsoring message comprising (a) an identifier of the second user terminal sponsoring the data connectivity of the first user terminal; and (b) an identifier of the sponsored service. The second sending procedure comprises sending, to a network node hosting another policy and charging rules function, said network node being hereinafter referred to as "second PCRF", a second sponsoring message comprising an identifier of the sponsored service. The third receiving procedure comprises receiving, from the second PCRF, a third sponsoring message comprising a sponsored data amount. The third sending procedure comprises sending, to the first PCRF, a fourth sponsoring message comprising (a) an identifier of the second user terminal sponsoring the data connectivity of the first user terminal, (b) an identifier of the sponsored service, and (c) the sponsored data amount.

In one embodiment, a method is carried out by a network node hosting a policy and charging rules function for participating in providing a service requiring data connectivity between at least two user terminals comprising a first user terminal and a second user terminal. The method comprises a receiving procedure and a sending procedure. The receiving procedure comprises receiving, from a network node hosting an application function, a so-called second sponsoring message comprising an identifier of a sponsored service. The sending procedure comprises sending, to the network node hosting the application function, another so-called third sponsoring message comprising a sponsored data amount.

In one embodiment, a method is carried out by a user terminal, hereinafter referred to as "second user terminal", for participating in providing a service requiring data connectivity between the second user terminal and at least one other user terminal, hereinafter referred to as "the at least one peer user terminal". The method comprises a receiving procedure and a sending procedure. The receiving procedure comprises receiving, from an ASP, a request to sponsor the data connectivity of one of the at least one peer user terminal, namely the data connectivity of a so-called first user terminal, so as to permit the data connectivity required for the service to be provided. The sending procedure comprises indicating, to the ASP, that the second user terminal agrees to sponsor the data connectivity of the first user terminal so as to permit the data connectivity required for the service to be provided.

The invention also relates to a system of network nodes as described above, implemented for example using a set of programmed computers or the like.

The invention also relates to computer programs, computer program products and storage mediums comprising computer-readable instructions configured, when executed on network nodes or user terminals, to cause the network nodes or user terminals to participate in a method according to any one of the above-described embodiments, or to implement the functions of a network node or user terminal according to any one of the above-described embodiments.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims. A list of abbreviations and their meaning is provided at the end of the detailed description.

Figure 1:
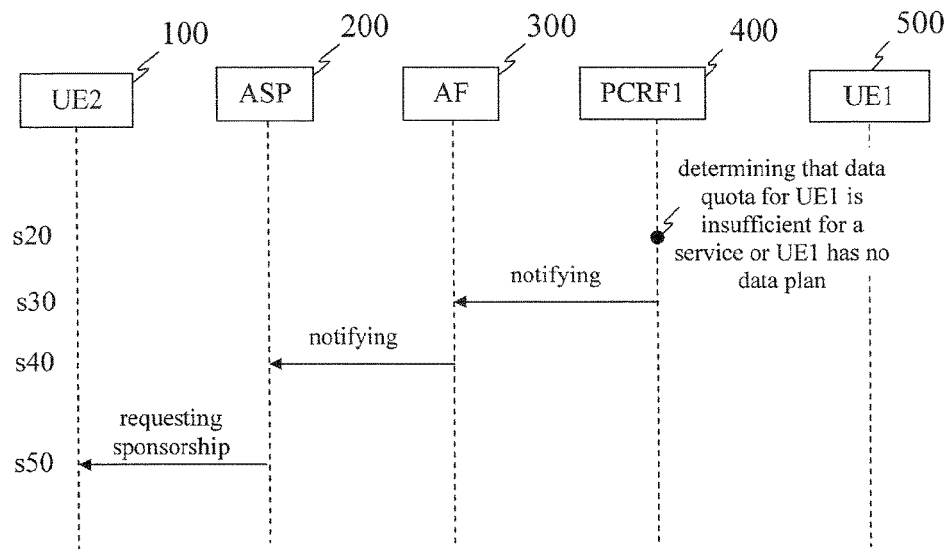
FIG. 1 is a message sequence chart of a method in one embodiment of the invention.

FIG. 1 is a message sequence chart illustrating the exchange of messages between entities in a method in one embodiment of the invention. The method involves a first user terminal "UE1" 500 having a limited data plan (and thus having potentially, at one point in time, an insufficient data quota for a service to be provided) or no data plan at all (and thus no data quota), a second user terminal "UE2" 100 having a data plan, an ASP 200 (for providing for example over-the-top (OTT) services), an AF 300, and a PCRF "PCRF1" 400 in charge of determining the PCC rules for UE1 500. In the present context, having no data plan does not mean that the exchange of data packets (such as IP packets) is not permitted for a user terminal under all circumstances. The user terminal has at least an established PDN connection that entitles it to exchange IP traffic, notably to contact the ASP and PCRF and possibly to perform basic browsing operations. The method illustrated in FIG. 1 involves the following steps.

In step s20, PCRF1 400 determines, at one point in time during a procedure aiming at providing a service requiring data connectivity between UE1 500 and UE2 100, that there is no available data quota associated with UE1 500 for the data connectivity required for the service to be provided. This may be either because the remaining data quota for UE1 500 is insufficient for the service to be provided (for example because UE1's data quota is exhausted or almost exhausted) or because UE1 500 has no data plan at all (and thus no data quota).

The determination that there is no available data quota associated with UE1 500 for the data connectivity required for the service to be provided may also be made at one point in time when the service is already in the process of being provided. In this case, it is a determination that there is no available data quota associated with UE1 500 for the data connectivity required for the service to be continued. For example, this may occur if a service is available for free for a few first minutes or hours (so that the service may be provided even though UE1 500 has no data plan or has a data plan but the remaining data quota is insufficient for the service to be provided) and then, after these few first minutes or hours, the service is no longer provided for free and its use should be accounted for in a user's account.

Then, PCRF1 400, after making determination s20, notifies s30 AF 300 about the determination. In turn, AF 300 notifies ASP 200 about the determination. ASP 200 then requests UE2 100 to sponsor the data connectivity of UE1 500 so as to permit the data connectivity required for the service to be provided between UE1 500 and UE2 100 (i.e., both UE2, which is requested to sponsor UE1's data connectivity, and UE1 are participating to the service, once established). UE2 100 may accept or refuse to sponsor the data connectivity of UE1 500. If UE2 100 accepts to sponsor the data connectivity for UE1 500, the service may be provided. If UE2 100 refuses to sponsor the data connectivity of UE1 500, the service cannot be provided.

Step s30 of notifying may be implemented by transmitting a message from PCRF1 400 to AF 300. A message is a set of bits which can be transmitted over a communication network, for example in the form of a packet. A message may also be transmitted through a series of packets. The same applies to step s40 of notifying from AF 300 to ASP 200 and to the request transmitted, in step s50, from ASP 200 to UE2 100. The same applies herewith to any communication between two network nodes or between a network node and a user terminal.

The UEs schematically illustrated on FIG. 1, namely UE1 and UE2, may be any type of communication terminals such as, for example, mobile phones, smartphones, laptops, desktop computers, tablet PCs, gaming devices, etc. Furthermore, UE1 and UE2 may be of the same type or of different types.

The service to be provided may be any service involving more than one user terminal and requiring a data connectivity, such as, for example, one of a video conference call, a voice over Internet Protocol (IP) call, a chat application, a multi-player game, or any combination of a video conference call, a voice over Internet Protocol (IP) call, a chat application, and a multi-player game. Embodiments of the invention are not limited however to these services, but may apply to any service involving at least two user terminals, provided that the service requires data connectivity for the involved user terminals. Generally speaking, data connectivity between at least two user terminals requires the at least two user terminals to have a session established through each respective user plane or media plane and being assigned one or more bearers for transporting user data packets. Since establishing data connectivity requires reservation and use of network resources, the data connectivity may be conditioned to the type of subscription that each user has with the network operator and, more precisely, to the particular data plan to which each user might have subscribed, if any. In one embodiment, a service requiring data connectivity is defined as a service requiring a PDN connection that is defined as the association between a UE represented by one IPv4 address and/or one IPv6 prefix and a PDN represented by an Access Point Name (APN).

Although FIG. 1 schematically illustrates fives entities, more entities may be involved. Namely, the architecture may also involve more user terminals, PCEFs (to enforce policy rules decided by the PCRF1 or other PCRFs), further PCRFs (as illustrated on FIG. 4), a TDF, further AFs, a BBERF, an OCS, etc. Some embodiments of the invention, however, involve more entities than those depicted on FIG. 1. The invention also relates to network nodes and user terminals when considered individually.

In one embodiment, the sponsorship by peer is carried out on a per service instance basis.

Figure 2:
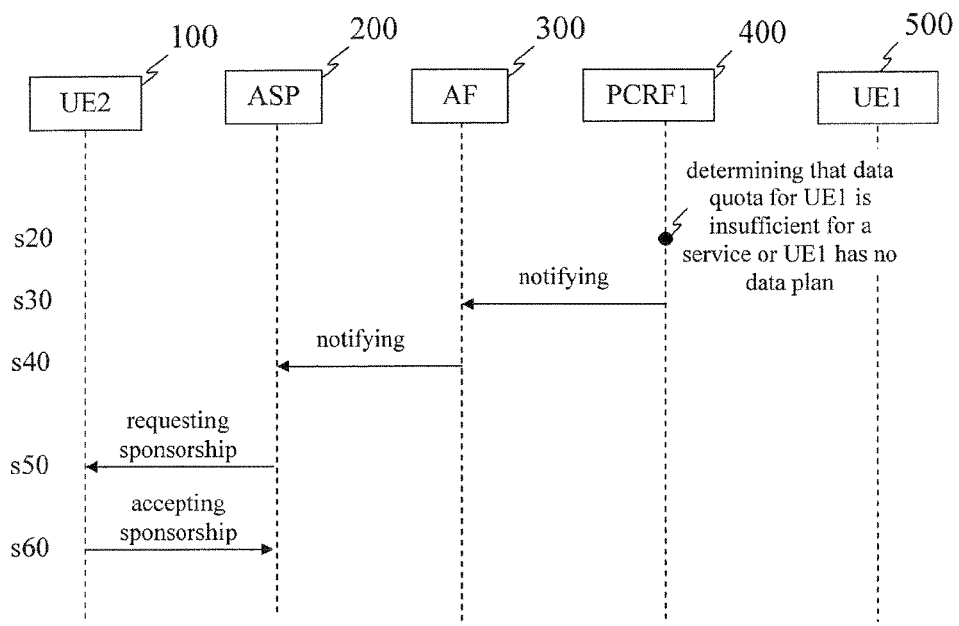
FIG. 2 is a message sequence chart of a method in one embodiment of the invention, wherein a second user terminal accepts to sponsor the data connectivity of a first user terminal.

FIG. 2 is a message sequence chart illustrating a method in one embodiment of the invention, which differs from the method illustrated in FIG. 1 by the following step s60 performed after step s50.

Namely, in step s60, UE2 100 informs ASP 200 that UE2 100 accepts to sponsor the data connectivity of UE1 500 to allow the data connectivity required for the service to be provided between UE2 100 and UE1 500.

Upon receiving a request for a sponsorship from ASP 200, UE2 100 may carry out a procedure to let the user operating UE2 100 make a decision as to whether to accept or refuse to sponsor the data connectivity of UE1 500. Such procedure may involve prompting the user to interact with a user interface (such as for example through a pop-up window or the like) to let the user make a decision. In one embodiment, UE2 100 stores a computer program for generating a graphical user interface on a display screen, the graphical user interface having at least one control element through which the user can be informed of received sponsoring notifications, indicating at least one of the identity of the user to be sponsored, the sponsored service and the requested data amount. The at least one control element are also configured to allow the sponsoring user to accept or reject the received sponsoring requests. Once the user accepts the sponsoring, the at least one control element is configured for generating, or causing the generation of, signalling to inform ASP 200 of the decision(s). Notifications may also be provided to UE1 500, through similar control element(s), to provide for example information about the sponsored service(s), the identity of the sponsoring UE, and the amount of data being sponsored or expected to be sponsored. The at least one control element may be adapted to be activated by input means such as by an input device 400-2 as discussed below with reference to FIG. 10.

The invention, however, is not limited to a user interface interaction responsive to a request received from ASP 200. A request for sponsorship may also be automatically handled based on parameters configured in advance within UE2 100, without the need for the user to interact, for each service instance, with UE2's 100 user interface. To avoid asking the sponsoring user terminal UE2 every time, the ASP or PCRF2 (see FIG. 4) may also be configured in advance (for example with the rule that UE2 always sponsors UE1).

As part of step s60, UE2 100 may also indicate to ASP 200 that UE2 100 agrees to sponsor the data connectivity of UE1 500 but only up to a specified data amount.

The data amount may, in one embodiment, be specified by the user operating UE2 100 upon accepting the sponsorship request.

Figure 3:
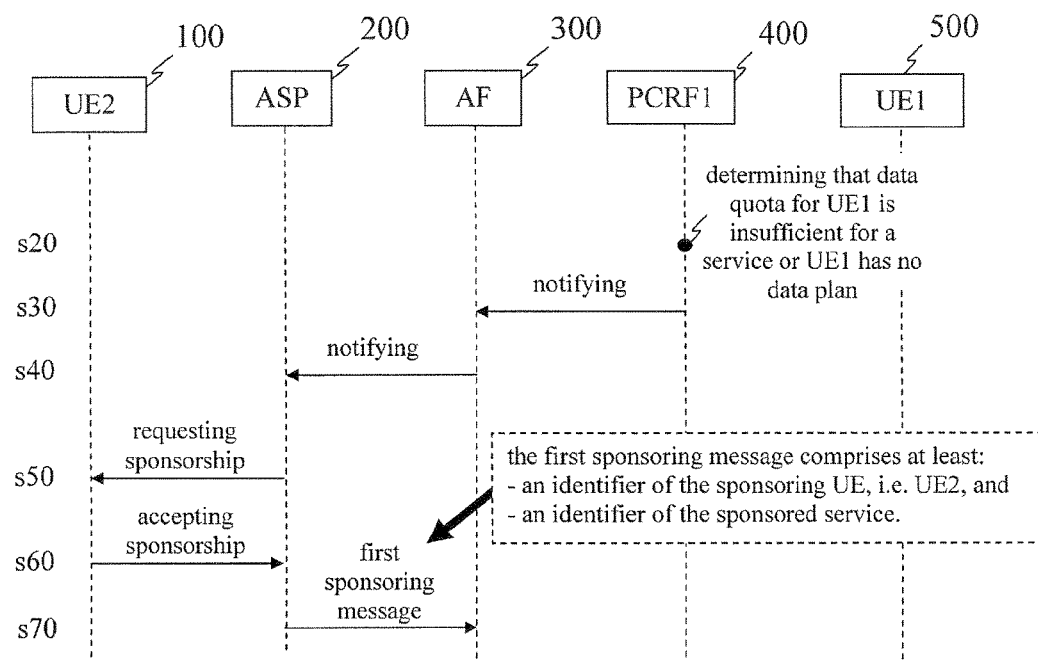
FIG. 3 is a message sequence chart of a method in one embodiment of the invention, wherein an ASP informs an AF that a second user terminal has accepted to sponsor the data connectivity of a first user terminal.

FIG. 3 is a message sequence chart illustrating a method in one embodiment of the invention, which differs from the method illustrated in FIG. 2 by the following step s70 performed after step s60.

Namely, in step s70, ASP 200 transmits, to AF 300, a message, here referred to as first sponsoring message, comprising at least an identifier of the sponsoring UE, i.e. UE2 100, and an identifier of the sponsored service.

The first sponsoring message may further carry an identifier of UE1 500 and information about the requested data amount to be sponsored (for example the data amount specified by UE2 100 as the one up to which UE2 100 agrees to sponsor the data connectivity of UE1 500). The information about the requested data amount to be sponsored may also be set by ASP 200 without the intervention of UE2 100.

Figure 4:
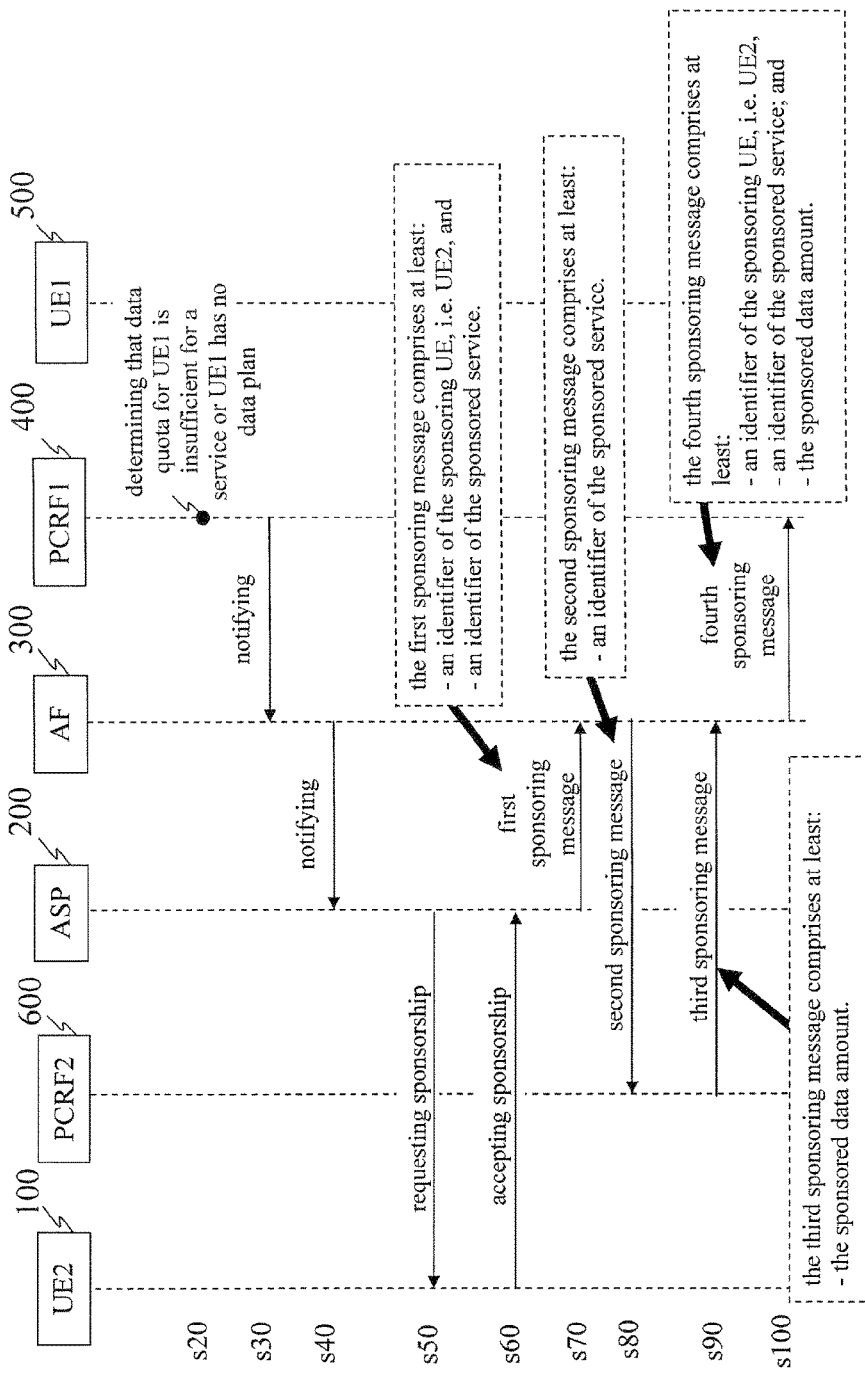
FIG. 4 is a message sequence chart of a method in one embodiment of the invention, wherein further steps are performed compared to those performed in the methods illustrated by FIGS. 1 to 3.

FIG. 4 is a message sequence chart illustrating a method in one embodiment of the invention, which differs from the method illustrated in FIG. 3 by the following steps s80, s90 and s100 performed after step s70.

Namely, in step s80, a message, here referred to as second sponsoring message, is transmitted from AF 300 to a PCRF "PCRF2" 600. PCRF2 600 is in charge of deciding the PCC rules applicable to UE2 100. In one embodiment, PCRF1 400 and PCRF2 600 are the same PCRF (implying therefore that fewer messages need to be transmitted compared to what is schematically illustrated on FIG. 4).

The second sponsoring message comprises at least an identifier of the sponsored service. If the second sponsoring message comprises only an identifier of the sponsored service, PCRF2 600 decides to which extent (i.e., up to which data amount) the sponsoring by UE2 100 can be accepted and enforced within the PCC architecture.

In step s90, PCRF2 600 then transmits a third sponsoring message comprising the sponsored data amount to AF 300. In step s100, AF 300 then transmits a fourth sponsoring message to PCRF1 400. The fourth sponsoring message comprises at least an identifier of the sponsoring UE, i.e. in this case UE2 100, an identifier of the sponsored service, and the sponsored data amount (as set or approved by PCRF2 600).

The second sponsoring message may further comprise (not illustrated on FIG. 4) an identifier of UE1 500, i.e. the user terminal to be sponsored. PCRF2 600 may therefore decide to which extent the sponsoring request can be accepted taking into account the identity of the user terminal to be sponsored.

The second sponsoring message may further comprise information about the requested data amount to be sponsored. The requested data amount to be sponsored may have been specified by UE2 100 or by ASP 200. Upon receiving the second sponsoring message including information about the requested data amount to be sponsored, PCRF2 600 decides to which extent the sponsoring request can be accepted, i.e. which portion of the requested data amount to be sponsored can actually be sponsored. The outcome of the decision may be that the entire requested data amount to be sponsored is approved by PCRF2 600.

In one embodiment, after the steps discussed with reference to any one of FIGS. 1 to 4 are carried out, the service is actually provided between UE1 500 and UE2 100, taking into account that the data connectivity of UE1 500 is sponsored by UE2 100 so as to permit the data connectivity required for the service to be provided.

In one embodiment, after the steps discussed with reference to any one of FIGS. 1 to 4 are carried out, the method further comprises monitoring the amount of data transferred between UE1 500 and a packet-switched network in the context of providing the desired service. Then, the monitored amount of data transferred between UE1 500 and the packet-switched network is taken into account by the PCC architecture as if the amount of data had been transferred between UE2 100 and the packet switched network. In other words, the amount of data quota actually consumed by UE1 500 is deducted from the data quota account of UE2 100. In such a manner, the data volume consumed during the service session by both the first and second user terminal is deducted from the second terminal's account. This embodiment may for example involve the following steps: (i) PCRF1 400 receives (from the PCEF in charge of monitoring UE1's 500 data consumption) information about the data usage by UE1 500; (ii) PCRF1 400 sends the information about the data usage to AF 300; (iii) the AF sends the information to PCRF2 600; and (iv) PCRF2 600 deducts the data usage from UE2's 100 account.

Now, to further understand the advantages of the invention, the context in which some embodiments of the invention have been developed and may be put into practice will be explained in more detail (notably with reference to FIG. 5), followed by the description of further embodiments.

Figure 5:
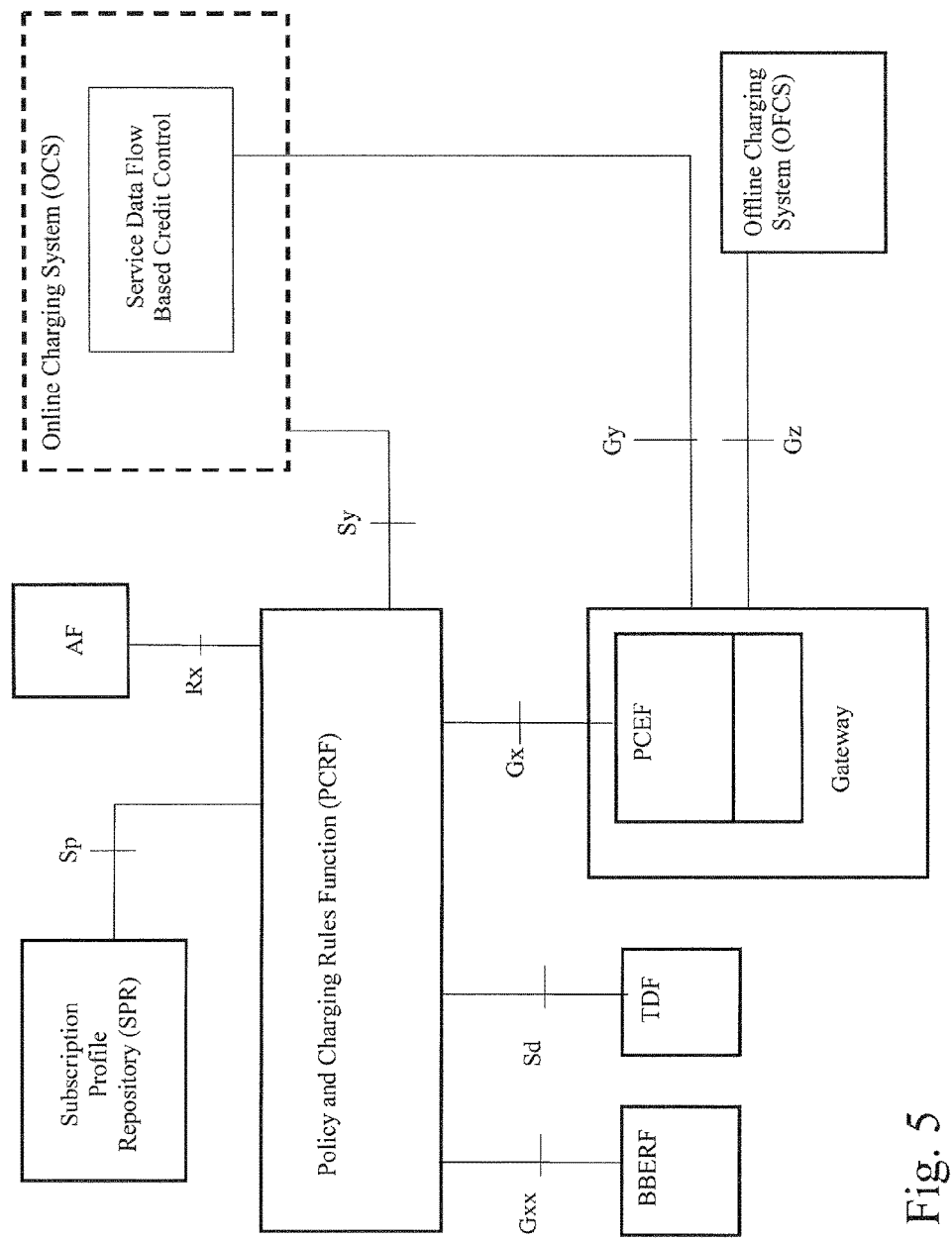
FIG. 5 schematically illustrates elements of a PCC architecture in the context of which embodiments of the invention may be implemented.

An exemplary PCC architecture is schematically illustrated on FIG. 5. The diagram is similar to the one shown in 3GPP TS 23.203 (v12.0.0), page 21, which specifies the PCC functionality for Evolved 3GPP Packet Switched domain, including both 3GPP accesses (GERAN/UTRAN/E-UTRAN) and non-3GPP accesses. Among the nodes illustrated on FIG. 5, in particular the PCRF and AF are improved in embodiments of the invention compared to the prior art.

As explained above in the background section, the PCRF is a functional element that encompasses policy control decision and flow based charging control functionalities. The PCRF provides network control regarding the service data flow detection, gating, QoS and flow based charging (except credit management) towards the PCEF. The PCRF receives session and media related information from the AF and informs the AF of traffic plane events, i.e. user plane events.

The PCRF provisions, i.e. provides, PCC rules to the PCEF via the Gx reference point. The PCRF informs the PCEF, through the use of PCC rules, on the treatment of each service data flow that is under PCC control, in accordance with the PCRF policy decision(s).

The AF is an element offering applications in which service is delivered in a different layer (i.e. transport layer) from the one the service has been requested (i.e. signalling layer). In other words, the AF is an element offering applications that require dynamic policy and/or charging control over the IP-CAN user plane behaviour. The AF communicates with the PCRF to transfer dynamic session information required for PCRF decisions as well as to receive IP-CAN specific information and notifications about IP-CAN bearer level events. The AF allows the control of IP bearer resources in the media plane according to what has been negotiated in the control plane. One example of an AF is the P-CSCF of the IM CN subsystem. The AF communicates with the PCRF to transfer dynamic session information (i.e. description of the media to be delivered in the transport layer). This communication is performed using the Rx interface.

The PCEF encompasses service data flow detection (based on filters definitions included in the PCC rules), as well as online and offline charging interactions (not described here) and policy enforcement. Since the PCEF is the system element handling the bearers, this is where the QoS is being enforced for the bearer according to the QoS information coming from the PCRF. The PCEF functional entity is located at the Gateway (e.g. GGSN in the GPRS case, PGW in the EPS case and PDG in the WLAN case). For the cases where there is PMIP instead of GTP protocol between BBERF and PCEF, the bearer control is done in the BBERF instead.

When providing a data plan to subscribers, operators usually set mobile broadband subscriptions involving a limit as to the data that can be consumed. This implies controlling the data usage limits, something which can be done in a PCC architecture. Controlling, in a fair manner, the network usage is necessary for properly managing the large volumes of traffic generated by mobile broadband users.

A PCC architecture enables to measure the volume of traffic on a per subscriber basis, to detect when a subscriber has exceeded his/her fair usage limit, and dynamically to take the consequent actions to restrict the access network resources assigned to that subscriber. In a PCC architecture, a PCEF can report the subscriber usage to the PCRF which monitors the usage accumulated by each subscriber. According to the usage limits established in the subscriber subscription, the PCRF can take some decisions, e.g. bandwidth limitation, when a limit is reached.

As mentioned above in the "Background" section, reference [1], Annex N, discloses a solution to let a service provider sponsor the data connectivity of a user with a limited data plan.

The PCRF is informed by the AF of the sponsoring condition via Rx interface. As part of the PCC rules provisioning procedure, the PCRF indicates to the PCEF in the PCC rule definition whether the data flows specified in the PCC rule are sponsored. In the PCC rule definition, the identity of the sponsor and the identity of the ASP are included.

The AF may indicate usage thresholds to the PCRF. The PCRF initiates usage monitoring procedures to monitor the usage related with the sponsored service to detect when the usage threshold indicated by the AF is reached.

Let us now discuss some of the problems addressed by embodiments of the invention, for further understanding the context in which some embodiments of the invention have been developed.

Situations have been identified where the satisfactory delivery of services requiring a data connectivity to users cannot be assured.

A scenario identified to which some embodiments of the invention may apply relates to the provision of a service that involves two users, e.g. a voice over IP call, gaming, etc., where the provision of the service is not feasible because the data usage limit of one of the users has been reached (or almost reached) or because one of the users has no data plan. In this situation, the service cannot be delivered to the users.

Some embodiments of the invention aim at addressing these problems and encompass a solution for situations in which the delivery of a service requiring data connectivity is not possible because (i) one of the users has no data plan (and thus no data quota associated therewith) or (ii) both users have a data plan but, for one of them, the remaining data quota is insufficient for providing the service. In this situation, in prior art solutions, the service between both users cannot be delivered.

A practical example of this scenario would be that of a father and his son wherein the father has a subscribed data plan but the father does not want to pay for a data subscription for his son, and however he would like to be able to establish a video conference call with his son on demand.

Some embodiments of the invention overcome the limitations of the above-described situation and allow the establishment of the service requiring data connectivity between the users.

Based on the PCC architecture and especially the PCRF entity, some embodiments of the invention propose a mechanism, wherein, upon detection of the above-described situation, one of the users accepts that all the data volume consumed during the service session is deducted from his/her account. In other words, one of the users accepts to sponsor the other user.

Compared to the sponsored data connectivity disclosed in reference [1], Annex N, in embodiments of the invention, the entity that sponsors the service for a user is another user, who elects to sponsor the data connectivity in order to establish a communication with the beneficiary.

In one embodiment, one user terminal sponsors the data connectivity for another user terminal (one-to-one embodiment). However, some embodiments of the invention involve more than two user terminals, i.e. apply to services that involve data connectivity between more than two parties. In one embodiment, one of the user terminals sponsors the data connectivity for a plurality of user terminals (one-to-many embodiment). In one embodiment, a plurality of user terminals sponsor the data connectivity for one user terminal (many-to-one embodiment). In this embodiment, the sponsoring effort is shared among a plurality of sponsoring user terminals. In one embodiment, a plurality of user terminals sponsor the data connectivity for a plurality of other user terminals (many-to-many embodiment). In this embodiment, the global sponsoring effort is also shared among a plurality of sponsoring user terminals.

Some embodiments of the invention apply to provide over-the-top (OTT) services such as video services delivered over the Internet to televisions and other connected devices. For example, OTT refers to content that arrives from a third party, such as Now TV, Netflix, Hulu or MyTV, and is delivered to an end user device, leaving the internet service provider responsible only for transporting IP packets. Consumers can access OTT content through internet-connected devices such as, for example, PCs, laptops, tablets, smartphones, set-top boxes, smart TVs and gaming consoles. In particular, OTT services may be amongst the services handled by the ASP. Other embodiments of the invention apply to operator services such as IP Multimedia Subsystem (IMS) services. In such case, the AF is the P-CSCF of IMS core, and the ASP is the IMS core itself.

In one embodiment of the invention, the service to be provided is a service requiring data connectivity between at least two user terminals being subscribers of the same operator. This has the advantage that the data usage by a first user terminal UE1 in the operator's network can be deducted from the account of a second user terminal UE2 maintained by the same operator, since UE2 has subscribed to a data plan of that operator and the network resources consumed by UE1 are from the same operator. Therefore, in this embodiment, a convenient mechanism of exchange of data quotas may be adopted.

Figure 6A:
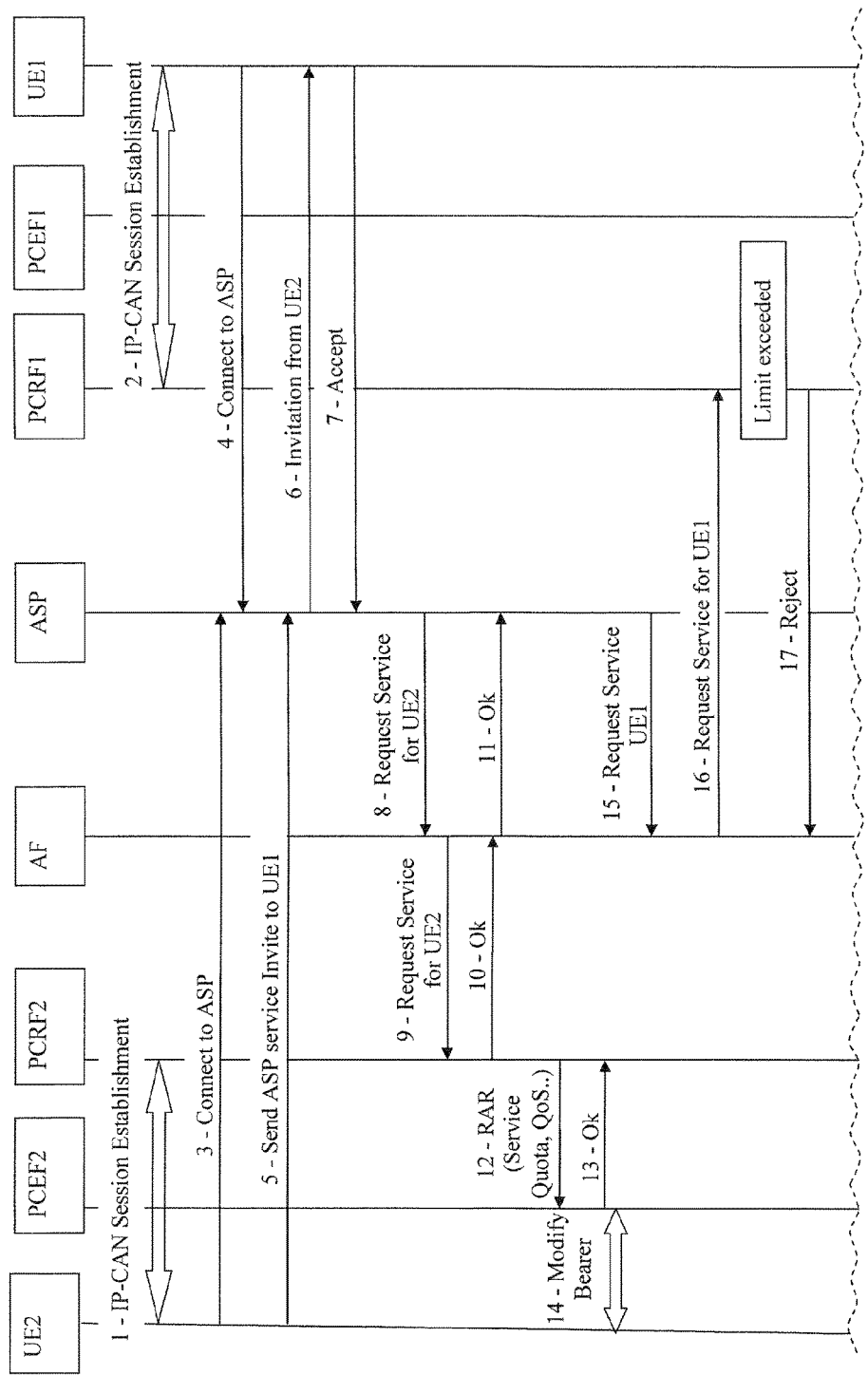
FIGS. 6*a* and 6*b*, which are to be read together, constitute a message sequence chart of a method in one embodiment of the invention.
Figure 6B:
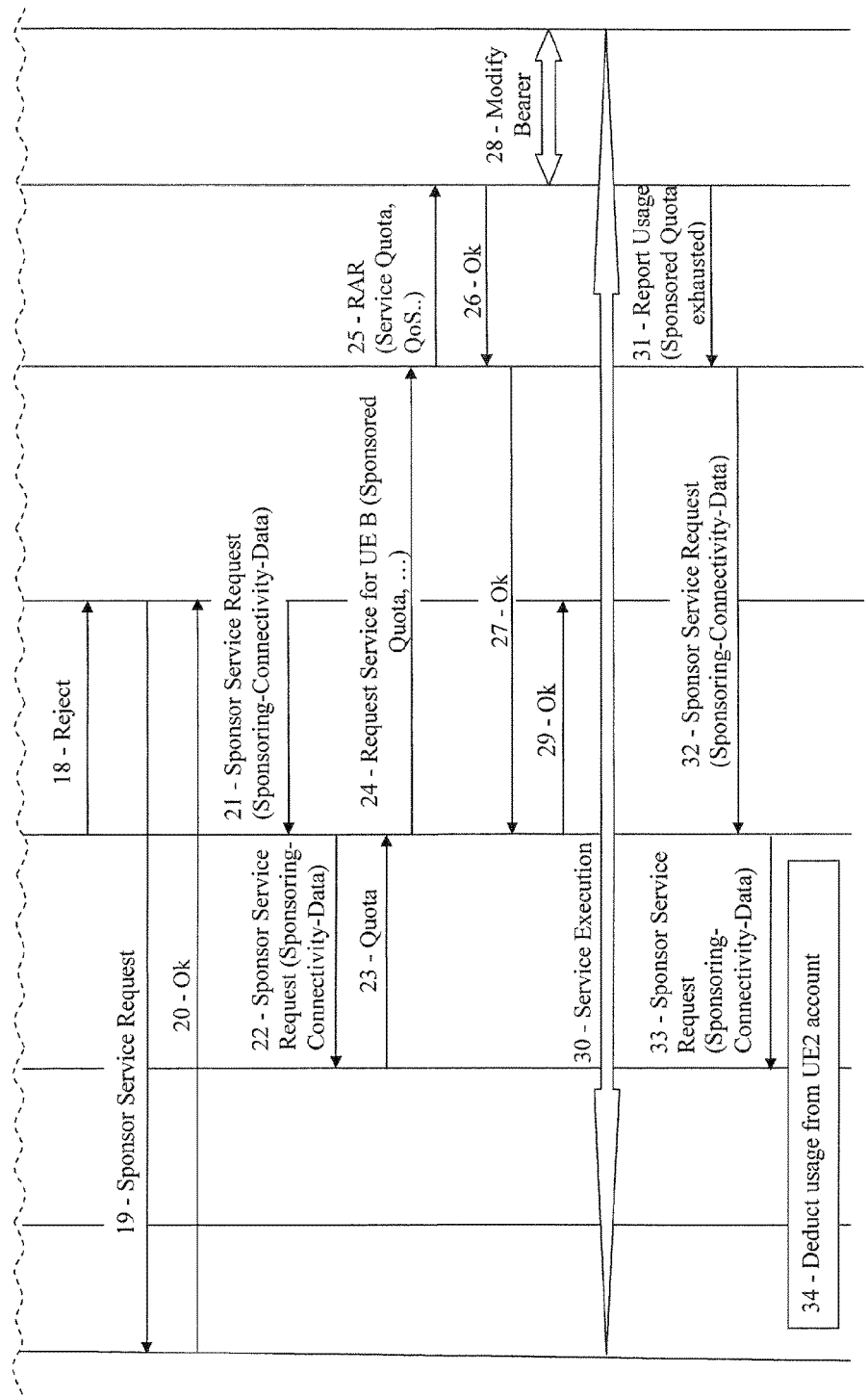

FIGS. 6a and 6b, which should be read together, is a message sequence chart schematically illustrating a method in one embodiment of the invention. The method involves respective UE1 and UE2 establishing a session with an IP Connectivity Access Network, i.e. an IP-CAN session, that may be achieved by activating a Primary PDP-context in the exemplary case of the IP-CAN being a GPRS network.

The message sequence chart illustrates an embodiment where two users, operating user terminals UE2 and UE1, wish to connect to enjoy a service requiring data connectivity, such as a voice-over-IP call. UE2 tries to make a voice-over-IP call to UE1 but the call cannot be made because UE1 does not have a subscribed data plan, or the remaining data quota associated with UE1's data plan is insufficient for the data connectivity required for the service to be provided (for example because the usage limit of the UE1 subscribed data plan has been reached). When this situation is detected, a procedure is initiated to ask UE2 to sponsor the data consumption of UE1 related with the service. Namely, the following steps are illustrated on FIGS. 6a and 6b:

In step 1, UE2 initiates an IP-CAN session (as illustrated by the arrow labelled "1—IP-CAN Session Establishment").

In step 2, UE1 initiates an IP-CAN session (as illustrated by the arrow labelled "2—IP-CAN Session Establishment").

In step 3, UE2 connects to ASP service (as illustrated by the arrow labelled "3—Connect to ASP").

In step 4, UE1 connects to ASP service (as illustrated by the arrow labelled "4—Connect to ASP").

In steps 5 and 6, UE2 invites UE1 to an ASP service session (as illustrated by the arrows labelled "5—Send ASP service Invite to UE1" and "6—Invitation from UE2").

In step 7, UE1 accepts UE2 invitation (as illustrated by the arrow labelled "7—Accept").

In step 8, ASP requests resources to AF for UE2 (as illustrated by the arrow labelled "8—Request Service for UE2"). The request contains the ASP application identifier (e.g. voice over IP), the service data negotiated by the terminals including the flow information (to allow IP traffic and media streaming from UE2 to UE1 and from UE1 to UE2).

In step 9, AF sends to PCRF2 an Authentication-Authorization-Request (AAR) request for resource allocation for UE2, containing the attributes specified in 3GPP TS 29.213 V11.6.0 (2013-03), "*Technical Specification, 3rd Generation Partnership Project; Technical Specification Group Core Network and Terminals; Policy and Charging Control signalling flows and Quality of Service (QoS) parameter mapping (Release* 11)" (hereinafter referred to as "reference [2]") (see especially subclause 4.3.1.2.1.1, FIG. 4.3.1.2.1.1.1, step 1) such as the application identifier (e.g. voice over IP) and the service data negotiated by the terminals including the flow information. This step is illustrated by the arrow labelled "9—Request Service for UE2".

In step 10, PCRF2 accepts the allocation of resources for UE2 (as illustrated by the arrow labelled "10—Ok").

In step 11, AF acknowledges the request to ASP (as illustrated by the arrow labelled "11—Ok").

In step 12, the IP-CAN session is reauthorized. Quota is sent to PCEF2 that will monitor the usage consumed by UE2 for this service. The reauthorization request sent to PCEF2 contains the dynamic PCC rule corresponding to the ASP service including a monitoring key to monitor the consumption related with this service. This step is illustrated by the arrow labelled "12—RAR (Service Quota, QoS . . . )".

In step 13, PCEF2 accepts new values (as illustrated by the arrow labelled "13—Ok").

In step 14, the bearer is reauthorized according to the QoS required by the negotiated service application (as illustrated by the arrow labelled "14—Modify Bearer").

In step 15, ASP requests resources to AF for UE1. The request contains the ASP application identifier (e.g. voice over IP), the service data negotiated by the terminals including the flow information (to allow IP traffic and media streaming from UE2 to UE1 and from UE1 to UE2). This step is illustrated by the arrow labelled "15—Request Service UE1".

In step 16, AF sends an Authentication-Authorization-Request (AAR) request for resource allocation for UE1 to PCRF1 containing the attributes specified in reference [2] (see especially subclause 4.3.1.2.1.1, FIG. 4.3.1.2.1.1.1, steps 1 and 2), such as the application identifier (e.g. voice over IP) and the service data negotiated by the terminals including the flow information. This step is illustrated by the arrow labelled "16—Request Service for UE1".

In step 17. PCRF1 rejects the allocation of resources because the UE1 has insufficient remaining data quota, for example because UE1 has reached the limit of data usage (e.g. a volume limit established as part of the user subscription). This step is illustrated by the box labelled "Limit exceeded" and the arrow labelled "17—Reject" on FIG. 6a, and corresponds to steps s20 and s30 illustrated on FIGS. 1 to 4.

In step 18. AF informs ASP about the resource reservation rejection (as illustrated by the arrow labelled "18—Reject" on FIG. 6b). This step corresponds to step s40 illustrated on FIGS. 1 to 4.

In step 19, ASP sends a sponsor request to UE2 indicating an identity of the user who requires to be sponsored, in the example UE1 (as illustrated by the arrow labelled "19—Sponsor Service Request"). This step corresponds to step s50 as illustrated on FIGS. 1 to 4.

The AF or ASP may decide to initiate the sponsoring procedure and select the potential sponsoring user, i.e., the user terminal to which the sponsoring request shall be sent. In the embodiment illustrated by FIGS. 6a and 6b, the ASP, upon reception in step 18 of the resource reservation rejection, initiates the sponsoring procedure. However, it may also be the AF. In such case, step 18 would be a sponsoring request sent from AF to ASP that would contain the identity of the sponsoring user. If it is ASP who initiates the sponsoring procedure, in step 18, the ASP shall select the sponsoring user. In the embodiment illustrated by FIGS. 6a and 6b, since only two users are involved, the decision is simple, but when more than two users are involved, AF or ASP may select among the list of users involved.

In step 20. UE2 accepts to sponsor the service for UE1 (as illustrated by the arrow labelled "20—Ok"). This step corresponds to step s60 illustrated on FIGS. 2 to 4.

In step 21, ASP sends a sponsor service request (i.e., a first sponsoring message) to AF (as illustrated by the arrow labelled "21—Sponsor Service Request (Sponsoring-Connectivity-Data)"). This step corresponds to step s70 illustrated on FIGS. 3 and 4. The message, referred to as first sponsoring message, contains:
  (a) {UE2 IP-Address} IP address of UE2 or, more generally an identifier of UE2, i.e. the sponsoring user terminal. This information is mandatory in the first sponsoring message.
  (b) {ASP service id} Identity of the service to be sponsored. This information is mandatory in the first sponsoring message.
  (c) [UE1 identity] Identity of the user to be sponsored. This information is optional in the first sponsoring message.
  (d) [Required Sponsored Quota] Amount of data quota to be sponsored. This is optional. The sponsored data quota may be configured per service in PCRF1 or decided by PCRF1 based on policies stored therein.

The first sponsoring message may contain information about the identity of the user to be sponsored, in this case UE1 identity. However. PCRF2 does not necessarily require knowing the identity of the user for whom UE2 is going to sponsor the data connectivity. However. PCRF2 may take the decision regarding the amount of data quota sponsored depending on the user sponsored. In this case, the message should contain the sponsored user identity.

In step 22, AF sends a sponsor service request (i.e., second sponsoring message) to PCRF2 (as illustrated by the arrow labelled "22—Sponsor Service Request (Sponsoring-Connectivity-Data)"). This step corresponds to step s80 illustrated on FIG. 4. The request (second sponsoring message) is an AAR defined in reference [2] (see especially subclause 4.3.1.2.1.1, FIG. 4.3.1.2.1.1.1, steps 1 and 2) extended with a Sponsoring-Connectivity-Data AVP that contains the following information:
  (a) {ASP service id} an identifier of the service to be sponsored. This information is mandatory in the second sponsoring message.
  (b) [UE1 identity] Identity of the user to be sponsored. This information is optional in the second sponsoring message.
  (c) [Required Sponsored Quota] Amount of data quota to be sponsored. This information is optional in the second sponsoring message. The sponsored data quota may also be configured per service in PCRF2 or decided in PCRF2 based on policies stored therein.

In step 23. PCRF2, based on the data plan subscribed for UE2 and considering the usage already consumed by UE2, grants some data quota to UE1, by sending the third sponsoring message, comprising the sponsored data quota (as illustrated by the arrow labelled "23—Quota" on FIG. 6b). This step corresponds to step s90 as illustrated on FIG. 4.

PCRF2 may take the decision on the amount of data quota sponsored based on the required sponsored data quota if received in the request, based on the service to be sponsored, based on the identity of the user to be sponsored if received in the request and/or based on any other dynamic condition (Dynamic conditions refer to any information the PCRF may know related with the context of the user session, e.g. whether the user is roaming, the Radio Access used, the UE location, or other dynamic information such as time of day. For example, sponsoring may only be allowed during morning time or when no roaming or in LTE Radio Access).

In step 24, AF sends again a service request (i.e., fourth sponsoring message) to PCRF1 but this time with sponsoring information, indicating that the service is sponsored (as illustrated by the arrow labelled "24—Request Service for UE B (Sponsored Quota, . . . )"). This step corresponds to step s100 illustrated on FIG. 4. The request is the AAR standardized in 3GPP TS 29.214 V11.8.0 (2013-03), *"Technical Specification; 3rd Generation Partnership Project; Technical Specification Group Core Network and Terminals; Policy and Charging Control over Rx reference point, (Release 11)"* (hereinafter referred to as "reference [3]") including the information of the Sponsored-Connectivity-Data defined in reference [2] (see especially subclause 4.3.1.2.1.1, FIG. 4.3.1.2.1.1.1, steps 1 and 2):

---

Sponsored-Connectivity-Data::=
    [ Sponsor-Identity ]
    [ Application-Service-Provider-Identity ]
    [ Granted-Service-Unit ]

---

The "Sponsor-Identity" is the identity of the sponsor (in the present example UE2); the "Application-Service-Provider-Identity" is the identity of the application (in the present example the ASP application); and the "Granted-Service-Unit" conveys the data quota which is sponsored.

In step 25, the IP-CAN session is reauthorized (as illustrated by the arrow labelled "25—RAR (Service Quota, QoS . . . )"). The data quota is sent to PCEF1, which will monitor the usage consumed by UE1 for this ASP service. The reauthorization request sent to PCEF1 contains the dynamic PCC rule corresponding to the ASP service including a monitoring key to monitor the consumption related with this service.

In step 26, PCEF1 accepts new PCC rules (as illustrated by the arrow labelled "26—Ok").

In step 27, AF receives the request acknowledgment from PCRF1 (as illustrated by the arrow labelled "27—Ok").

In step 28, the bearer is reauthorized according to the new values (as illustrated by the arrow labelled "28—Modify Bearer").

In step 29, AF acknowledges to ASP the sponsoring request (as illustrated by the arrow labelled "29—Ok").

In step 30, the ASP service session between UE2 and UE1 is provided (as illustrated by the arrow labelled "30—Service Execution").

In step 31, PCEF1 informs PCRF1 that ASP service quota limit has been reached (as illustrated by the arrow labelled "31—Report Usage (Sponsored Quota exhausted)"). A CCR update with usage reporting is sent, indicating the reason: data quota exhausted.

In step 32, PCRF1 notifies the usage consumed to AF. The notification to AF contains the usage consumed and the notification reason that the data quota is exhausted (as illustrated by the arrow labelled "32—Sponsor Service Request (Sponsoring-Connectivity-Data)").

In step 33, AF notifies usage consumed to PCRF2 by means of an AAR containing Sponsoring-Connectivity-Data AVP with the usage consumed (as illustrated by the arrow labelled "33—Sponsor Service Request (Sponsoring-Connectivity-Data)").

In step 34, PCRF2 deducts usage from UE2 account (as illustrated by the box labelled "34—Deduct usage from UE2 account").

At this point, PCRF2 may grant more data quota or indicate to AF and ASP to terminate the service because the data quota has been exhausted. If more data quota is granted, the procedure may be repeated from step 23.

Figure 7:
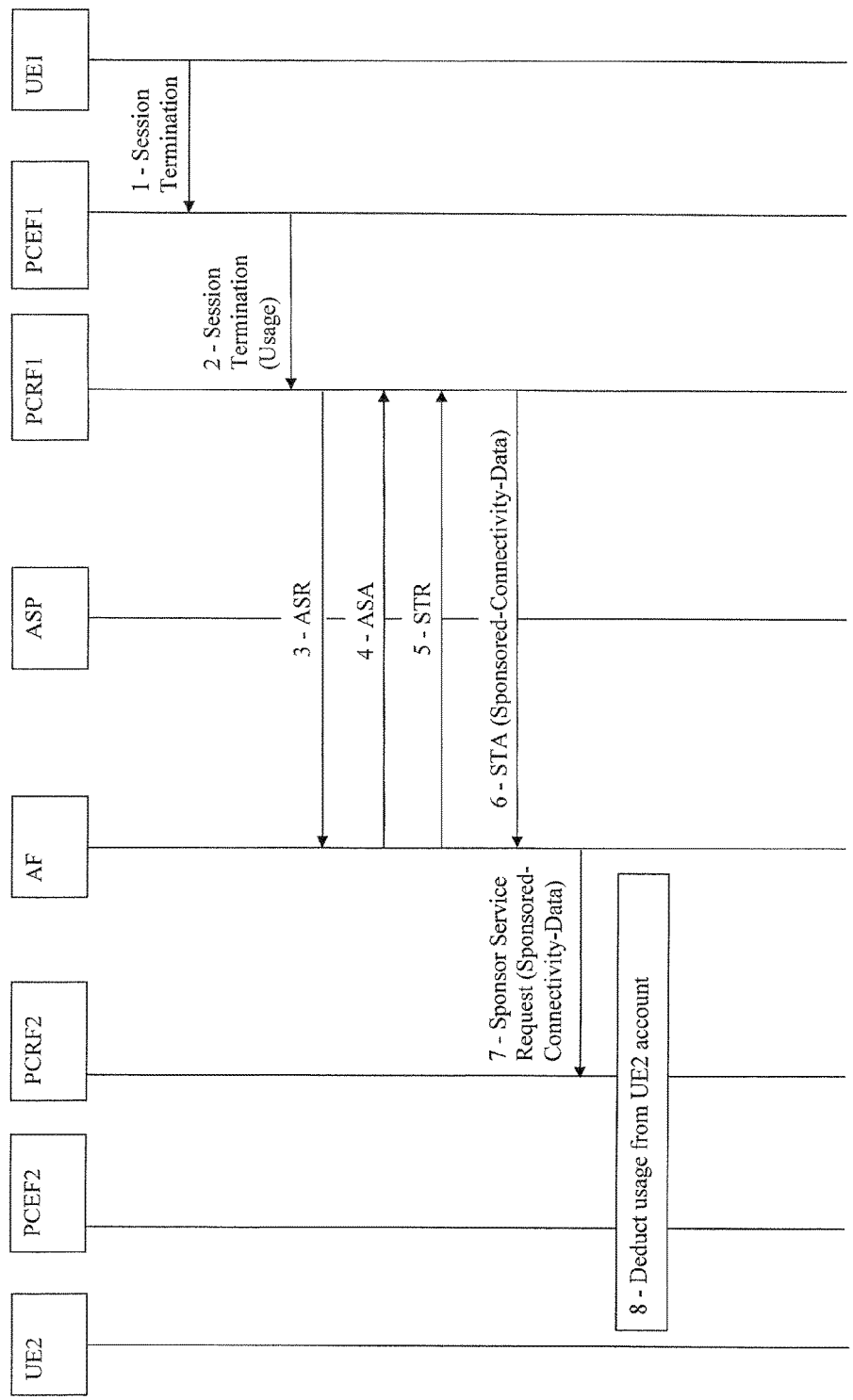
FIG. 7 is a message sequence chart of a method in one embodiment of the invention, involving the termination of a session by a first user terminal, i.e. by a sponsored user terminal.
Figure 8:
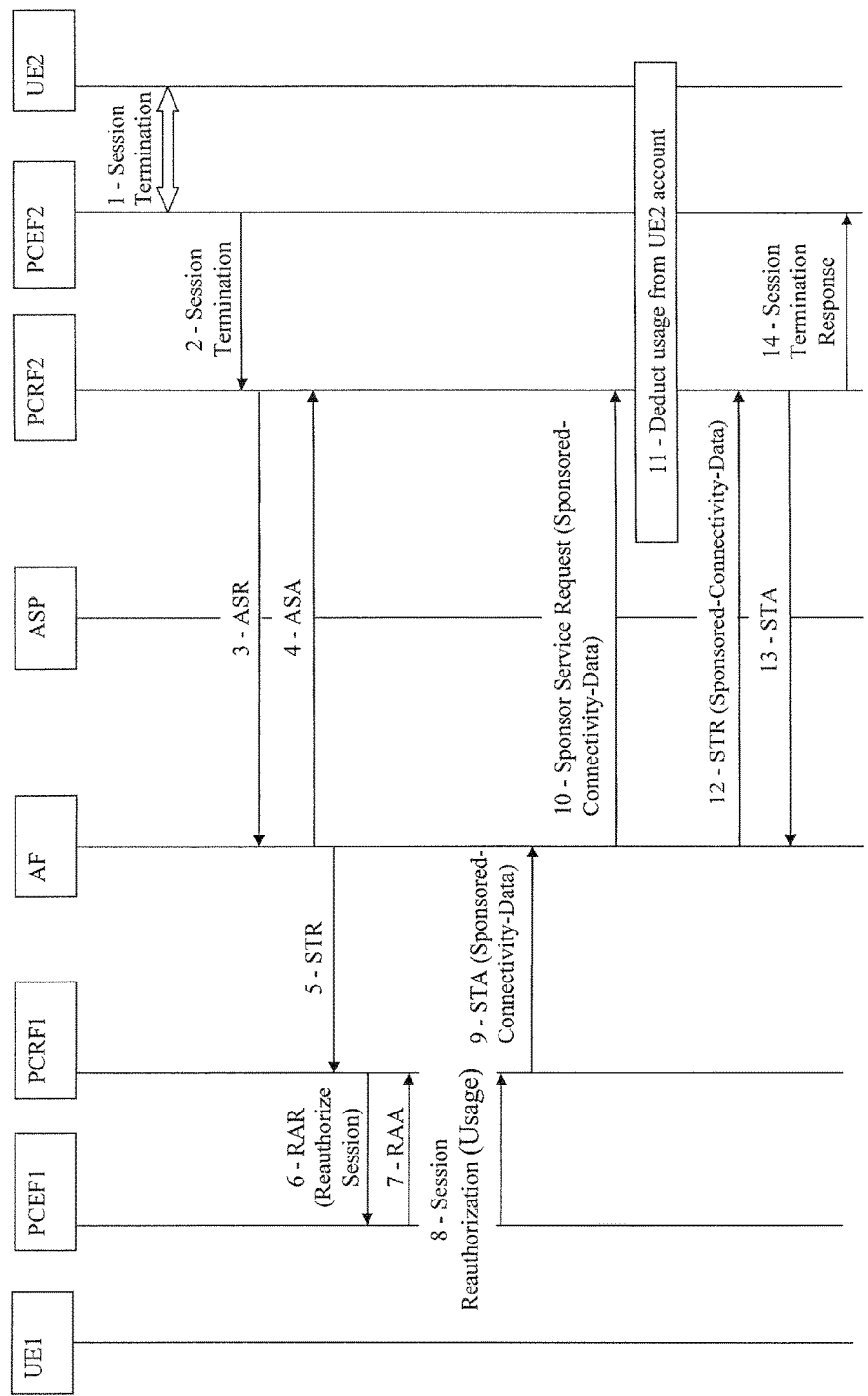
FIG. 8 is a message sequence chart of a method in one embodiment of the invention, involving the termination of a session by a second user terminal, i.e. by a sponsoring user terminal.

FIGS. 7 and 8 are message sequence charts schematically illustrating a session termination, in two embodiments of the invention.

FIG. 7 illustrates an embodiment where the sponsored user terminates the session.

In step 1, sponsored user UE1 terminates the session (as illustrated by the arrow labelled "1—Session Termination" on FIG. 7).

In step 2, PCEF1 sends a Gx CCR termination to PCRF1 reporting the usage consumed by UE1 (as illustrated by the arrow labelled "2—Session Termination (Usage)").

In step 3, PCRF1 sends an Rx Abort Session Request (ASR) to AF (as illustrated by the arrow labelled "3—ASR").

In step 4, AF sends an Abort Session Answer (ASA) to PCRF1 (as illustrated by the arrow labelled "4—ASA").

In step 5, AF sends a Session Termination Request (STR) to PCRF1 (as illustrated by the arrow labelled "5—STR").

In step 6, PCRF1 answers with a Session Termination Answer (STA) containing the usage consumed by sponsored user UE as part of the Sponsored-Connectivity-Data AVP (as illustrated by the arrow labelled "6—STA (Sponsored-Connectivity-Data)").

In step 7, AF notifies the usage consumed to PCRF2 (PCRF in the sponsoring user side, i.e. UE2 side) by means of an AAR containing Sponsoring-Connectivity-Data AVP with the usage consumed (as illustrated by the arrow labelled "7—Sponsor Service Request (Sponsored-Connectivity-Data)").

In step 8, PCRF2 deducts the usage received from the sponsoring user (UE2) account (as illustrated by the box labelled "8—Deduct usage from UE2 account").

FIG. 8 illustrates an embodiment where the sponsoring user (UE2) terminates the session, i.e. terminates the IP-CAN session. In this embodiment, sponsored user UE1 is forced to terminate the ASP service because the sponsoring is terminated once sponsoring user UE2 closes the connection.

The UE1 session is reauthorized, removing from the sponsored user session the PCC rules associated with the ASP and it is requested to report the usage consumed until that moment, in order to update UE2 account with the latest consumption.

In step 1, UE2 terminates the session (as illustrated by the arrow labelled "1—Session Termination" on FIG. 8).

In step 2, PCEF2 sends a Gx CCR termination to PCRF2 (as illustrated by the arrow labelled "2—Session Termination").

In step 3, PCRF2 sends an Rx Abort Session Request (ASR) to AF (as illustrated by the arrow labelled "3—ASR").

In step 4, AF sends an Rx Abort Session Answer (ASA) to the PCRF2 (as illustrated by the arrow labelled "4—ASA").

In step 5, AF sends a Rx Session Termination Request (STR) to PCRF1 indicating that UE1 session shall be terminated (as illustrated by the arrow labelled "5—STR").

In step 6, PCRF1 sends a Gx RAR to PCEF1 (as illustrated by the arrow labelled "6—RAR (Reauthorize Session)") to update UE1's IP-CAN session according to the ASP service termination, such as removing the PCC rules associated with the ASP service. The RAR will also force the reauthorization of the IP-CAN session requesting to PCEF1 to report the usage consumed by UE1 related with the ASP service.

In step 7, PCEF1 answers to the RAR by sending a RAA (as illustrated by the arrow labelled "7—RAA").

In step 8, PCEF sends a Gx CCR modification to PCRF1 containing the usage consumed (as illustrated by the arrow labelled "8—Session Reauthorization (Usage)").

In step 9, PCRF1 answers the STR request received from AF by sending a Session Termination Answer (STA) containing the usage consumed by UE1 as part of the Sponsored-Connectivity-Data AVP (as illustrated by the arrow labelled "9—STA (Sponsored-Connectivity-Data)").

In step 10. AF notifies usage consumed to PCRF2 by sending an AAR containing Sponsoring-Connectivity-Data AVP with the usage consumed (as illustrated by the arrow labelled "10—Sponsor Service Request (Sponsored-Connectivity-Data)").

In step 11, PCRF2 deducts the usage consumed by UE1 from UE2's account (as illustrated by the box labelled "11—Deduct usage from UE2 account" on FIG. 8).

In step 12, AF initiates a Session Termination Request (STR) towards PCRF2 (as illustrated by the arrow labelled "12—STR (Sponsored-Connectivity-Data)").

In step 13, PCRF2 sends a STA to AF (as illustrated by the arrow labelled "13—STA").

In step 14. PCRF2 acknowledges the session termination to PCEF2 has illustrated by the arrow labelled "14—Session Termination Response").

If a sponsoring user terminal leaves a conference, the consequence is generally that the service for the sponsored user terminal is terminated. If the sponsoring user terminal leaves the conference, there is generally no way to continue granting quota and deducting quota consumed from the sponsoring user terminal's account since the AF session for the sponsoring user terminal is terminated. However, in one embodiment, in a multiparty service session (more than two user terminals participating in an ASP service), one of the other user terminals takes over the sponsoring role. It is the responsibility of the AF or ASP to determine that the sponsoring user terminal has left the conference call (or more generally the multiparty service concerned) and, upon detecting this situation, to invite the rest of the participating user terminals to take over the role of sponsor until one of them accepts the invitation. If no one accepts, the sponsored user should leave the service in the same way as explained with reference to FIG. 8.

Figure 9:
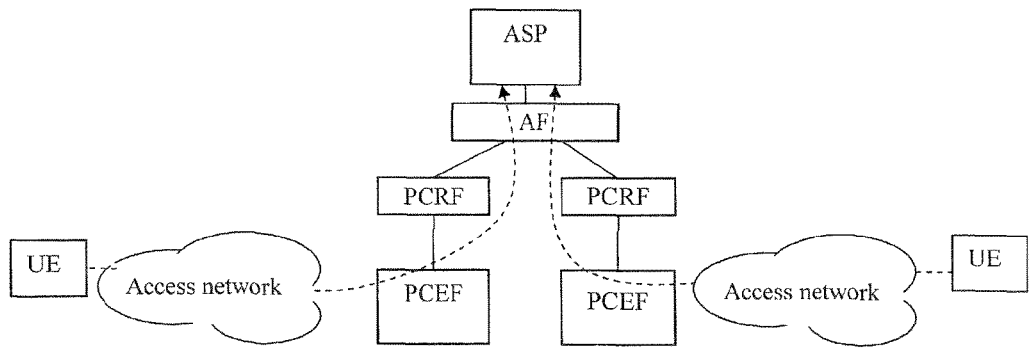
FIG. 9 schematically illustrates a network architecture in the context of which some embodiments of the invention may be implemented.

FIG. 9 schematically illustrates a network architecture in the context of which embodiments of the invention may be carried out.

The ASP is connected to the PCRFs, through the AF. The AF belongs to the operator domain and hides the network topology from the ASP (see for example reference [1], Annex N).

The AF selects and contacts the PCRF for service resource allocation by means of a DRA (Diameter Routing Agent) according to the procedures defined in reference [2], clause 7 "PCRF addressing". AF and PCRF are connected through Rx interface as defined in reference [1], subclause 5.2.1 "Rx reference point". The AF translates the messages received from the ASP application to Diameter Rx messages towards PCRF, though this translation function may also reside outside AF in a separate function (such as in a mediation function between the ASP and the AF, or embedded in the ASP). In FIG. 9, there are two PCRFs one for each UE involved in the ASP service session. The same PCRF may manage both UE sessions. PCRF selection is made by means of a DRA (Diameter Routing Agent) according to the procedures defined in reference [2], clause 7 "PCRF addressing".

Besides, although, for the sake of simplicity, it has been considered that only two UEs are involved, there may be ASP services that allow the participation of more than two UEs.

Let us now discuss some interfaces which may be involved in some embodiments of the invention, namely the ASP-AF interface, the PCRF-AF interface, and the PCRF-PCEF interface. The impacts on the PCRF in some embodiments of the invention are also discussed thereafter.

ASP-AF Interface

The interface between ASP and AF may be similar to the Rx interface specified in reference [1], subclause 5.2.1, and, more specifically, in reference [3]. However, in order to simplify the integration of ASP application, the use of SOAP or the like may be used.

Here are the types of requests that the ASP-AF interface may support, in one embodiment of the invention:
(a) Initial request from ASP in relation to an ASP service: The purpose of this request is to ask for resources to the AF related with an ASP service for a particular user. (In such a manner, resources can be allocated for the service in the network. The allocated resources are those required for the media components of the service.

For example, a video conference requires two media components, video and audio, with certain QoS values for each media component, e.g. for the video a GBR bearer is to be allocated whereas for the audio a non-GBR bearer may be allocated).

{IP-Address}: User IP address (or, more generally, identifier of the user terminal).

{ASP service id}: The identifier of the ASP service, e.g. voice over IP.

[Service-Description]: includes the service information negotiated. It may include the flow description and the QoS negotiated. The "Service-Description" is optional in this request.

(b) Sponsor service request (i.e., first sponsoring message) from ASP to AF:

{IP-Address}: IP address of the sponsoring UE, i.e. UE2 (or, more generally, identifier of the user terminal, comprising for example the IMSI/MSISDN and the IP address of the user terminal).

{ASP service id}: Identity of the service to be sponsored.

[UE1 identity]: Identity of the UE to be sponsored (UE1). This information is optional in the sponsor service request.

[Required Sponsored Quota] Amount of data quota to be sponsored. This information is optional, and the sponsored data quota may be configured per service in the PCRF2 or decided by the PCRF2 based on policies stored therein.

PCRF-AF Interface

Here are the types of requests that the PCRF-AF interface may support, in one embodiment of the invention:

(a) Authentication-Authorization-Request (AAR) request for service resource allocation as specified in reference [3].

(b) Sponsor service request (i.e., second sponsoring message): By means of this request, the AF requests to the PCRF (i.e., PCRF2) for data quota for the benefit of a sponsored user. The AAR as defined in reference [3], subclause 5.6.1 "AA-Request (AAR) command", may be extended by adding a Sponsoring-Connectivity-Data AVP with the following information:

{ASP service id}: Identity of the service to be sponsored.

[UE1 identity]: Identity of the user to be sponsored (i.e., UE1). This information is optional in the sponsor service request.

[Required Sponsored Quota]: Amount of data quota to be sponsored. This information is optional carried in the sponsor service request. The sponsored quota may be configured per service in the PCRF2 or decided by the PCRF2 based on policies stored therein.

(c) Sponsor service request answer (i.e., third sponsoring message): After receiving a sponsor service request (i.e., second sponsoring message), PCRF2 answers to AF with the sponsored data quota.

[Quota]: where sponsored data quota can be a value in terms of usage (e.g. volume/time).

(d) Request corresponding to the fourth sponsoring message. Namely, if two PCRFs (PCRF2 and PCRF1) are involved, the AF is capable of informing PCRF1 about the sponsored data amount, the sponsoring UE, and the sponsored service. This request from AF to PCRF1 may be a AAR request as defined in reference [3], subclause 5.6.1 "AA-Request (AAR) command", with sponsored data (reference [3], subclause 5.3.27 "Sponsored-Connectivity-Data AVP").

(e) Notification from PCRF (i.e., PCRF1) to AF with data quota exhausted indication. PCRF1 indicates to AF that the data quota initially granted has been consumed. This may be the RAR request defined in reference [3], subclause 5.6.3 "Re-Auth-Request (RAR) command", that contains the Sponsored-Connectivity-Data AVP (reference [3], subclause 5.3.27).

(f) Notification from AF to PCRF (i.e., PCRF2) with data quota exhausted indication. AF notifies PCRF2 that quota initially granted has been consumed. PCRF2 may grant more data quota or may decline to do so. If PCRF2 declines to do so, the ASP may terminate the service. This request is similar to as the sponsor service request as explained above (item (b) of the present section "PCRF-AF interface") where the proposed Sponsoring-Connectivity-Data AVP is extended with [Used-Service-Unit] AVP to convey the amount of usage consumed. Namely, the Sponsoring-Connectivity-Data AVP carries the following information:

{ASP service id}: Identity of the service to be sponsored.

[UE1 identity]: Identity of the user terminal to be sponsored. This information is optional.

[Required Sponsored Quota]: Amount of data quota to be sponsored. This information is optional, and the sponsored quota may be configured per service in the PCRF1 or decided by the PCRF1 based on policies.

[Used-Service-Unit]: Amount of data quota consumed. This information is optional.

PCRF-PCEF Interface

In one embodiment, there is no impact compared with the Gx interface specified in 3GPP TS 29.212 V11.8.0 (2013-03), "*Technical Specification, 3rd Generation Partnership Project; Technical Specification Group Core Network and Terminals; Policy and Charging Control (PCC); Reference points (Release 11)*" (hereinafter referred to as reference [4]). The same AVPs definition may be used for sponsored services. In this case, the sponsor identity contained in the PCC rule definition identifies the user terminal that sponsors the data connectivity.

PCRF Impacts

In some embodiments of the invention, a PCRF is able to perform at least the following actions:

(a) to receive requests from an ASP for resource reservation. Upon the receiving the request, the PCRF shall install corresponding PCC rules in the PCEF;

(b) to receive a request (i.e., a first sponsoring message) from an ASP asking for a sponsored data quota. Namely, an ASP indicates to a PCRF that the usage associated to that ASP service performed by another user terminal (user terminal to be sponsored, i.e., UE1) is to be sponsored by one of the user terminals for whom that PCRF is controlling an established IP-CAN session;

(c) to calculate the data quota that a user terminal (UE2) can sponsor for another user terminal (UE1);

(d) to receive from an ASP an indication about the data quota consumed by another user terminal (UE1) related with a previous sponsored data quota;

(e) to deduct from a user terminal's (UE2) account the data quota consumed by another user terminal related with a previous sponsored data quota.

In some embodiments of the invention, a mechanism is therefore provided to allow the execution of an ASP service between several user terminals when one of the parties involved does not have a data plan or when the usage limit of one of them has reached an established limit (or, more generally, when the data quota is insufficient for the data connectivity required for a service to be provided). The mechanism makes use of the PCC architecture wherein one of the user terminals sponsors the consumption of the other user terminals (one or more user terminals).

Figure 10:
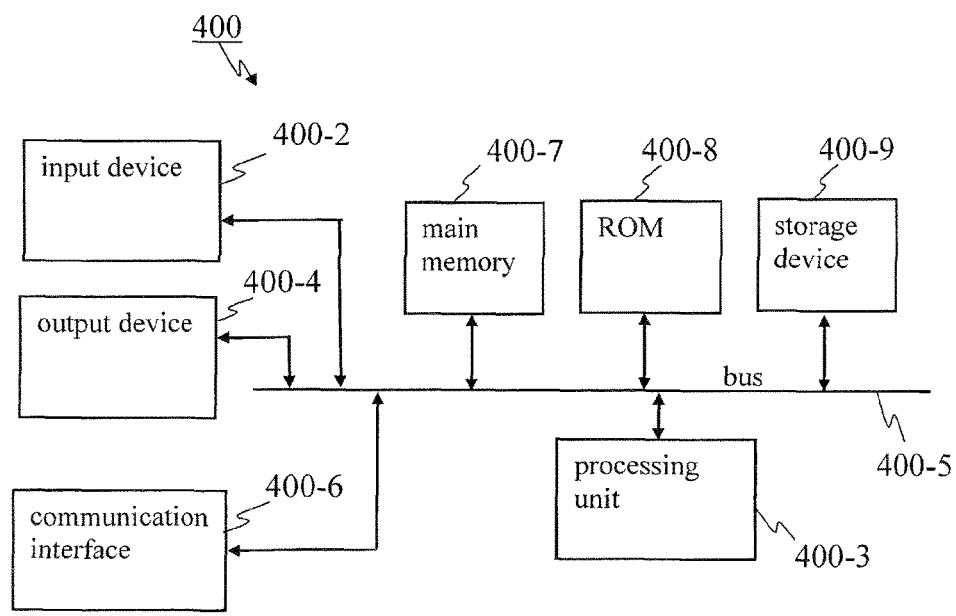
FIG. 10 schematically illustrates a structure of a network node or user terminal, wherein said structure may be that of various network nodes or user terminals according to embodiments of the invention.

FIG. 10 is a schematic diagram of an exemplary implementation of a network node 400 that may host a PCRF usable in embodiments of the invention. As illustrated, network node 400 may include a bus 400-5, a processing unit 400-3, a main memory 400-7, a ROM 400-8, a storage device 400-9, an input device 400-2, an output device 400-4, and a communication interface 400-6. Bus 400-5 may include a path that permits communication among the components of network node 400.

Processing unit 400-3 may include a processor, a microprocessor, or processing logic that may interpret and execute instructions. Main memory 400-7 may include a RAM or another type of dynamic storage device that may store information and instructions for execution by processing unit 400-3. ROM 400-8 may include a ROM device or another type of static storage device that may store static information and instructions for use by processing unit 400-3. Storage device 400-9 may include a magnetic and/or optical recording medium and its corresponding drive.

Input device 400-2 may include a mechanism that permits an operator to input information to network node 400, such as a keypad, a keyboard, a mouse, a pen, voice recognition and/or biometric mechanisms, etc. Output device 400-4 may include a mechanism that outputs information to the operator, including a display, a printer, a speaker, etc. Communication interface 400-6 may include any transceiver-like mechanism that enables network node 400 to communicate with other devices and/or systems (such as with an ASP or a PCEF). For example, communication interface 400-6 may include mechanisms for communicating with another device or system via a network.

Network node 400 may perform certain operations or processes described herein. These operations may be performed in response to processing unit 400-3 executing software instructions contained in a computer-readable medium, such as main memory 400-7, ROM 400-8, and/or storage device 400-9. A computer-readable medium may be defined as a physical or a logical memory device. For example, a logical memory device may include memory space within a single physical memory device or distributed across multiple physical memory devices. Each of main memory 400-7, ROM 400-8 and storage device 400-9 may include computer-readable media. The magnetic and/or optical recording media (e.g., readable CDs or DVDs) of storage device 400-9 may also include computer-readable media. The software instructions may be read into main memory 400-7 from another computer-readable medium, such as storage device 400-9, or from another device via communication interface 400-6.

The software instructions contained in main memory 400-9 may cause processing unit 400-3 to perform operations or processes described herein, such as those characterizing the PCRF. Alternatively, hardwired circuitry may be used in place of or in combination with software instructions to implement processes and/or operations described herein. Thus, implementations described herein are not limited to any specific combination of hardware and software.

Figure 11:
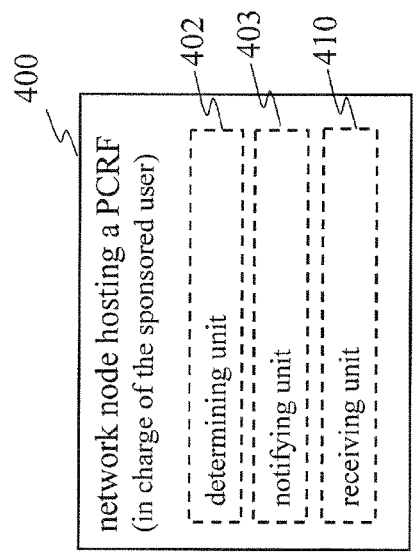
FIG. 11 schematically illustrates a network node hosting a PCRF in one embodiment of the invention, wherein the PCRF is in charge of a first user terminal, i.e. a sponsored user terminal.

FIG. 11 schematically illustrates, as one embodiment of the invention, a network node 400 hosting a first PCRF for participating in providing a service requiring data connectivity between at least two user terminals 100, 500. The first PCRF is in charge of deciding the PCC rules for a sponsoring user's user terminal 100. The network node illustrated on FIG. 11 may for example be implemented as illustrated on FIG. 10.

Network node 400 hosts a PCRF and may comprise a so-called determining unit 402, a so-called notifying unit 403 and a so-called receiving unit 410.

Determining unit 402 may for example be configured for determining that there is no available data quota associated with the first user terminal 500 for the data connectivity required for the service to be provided.

Notifying unit 403 may for example be configured for notifying another network node 300 hosting an AF about the determination made by determining unit 402.

Receiving unit 410 may for example be configured for receiving, from AF 300, a message comprising (i) an identifier of the second user terminal 100 sponsoring the data connectivity of the first user terminal 500; (ii) an identifier of the sponsored service; and (iii) a sponsored data amount.

In one embodiment (not illustrated), determining unit 401 may be configured for determining that there is no available data quota associated with the first user terminal 500 for the data connectivity required for the service to be started. In one embodiment (not illustrated), determining unit 401 is configured for determining that there is no available data quota associated with the first user terminal 500 for the data connectivity required for the service to be continued.

Figure 12:
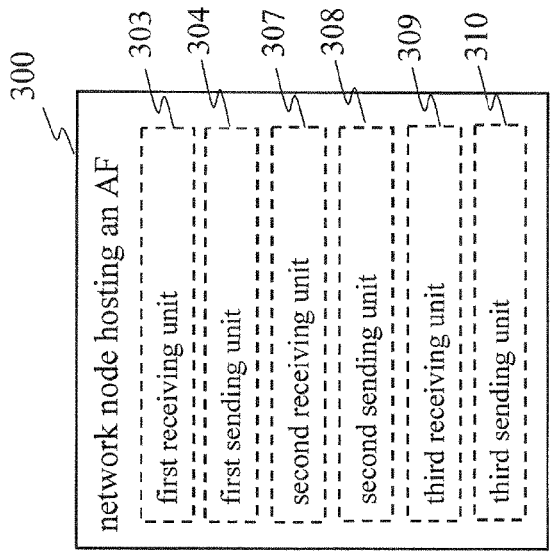
FIG. 12 schematically illustrates a network node hosting an AF in one embodiment of the invention.

FIG. 12 schematically illustrates, as one embodiment of the invention, a network node 300 hosting an AF for participating in providing a service requiring data connectivity between at least two user terminals 100, 500. The network node illustrated on FIG. 12 may for example be implemented as illustrated on FIG. 10.

Network node 300 hosts an AF and may comprise a so-called first receiving unit 303, a so-called first sending unit 304, a so-called second receiving unit 307, a so-called second sending unit 308, a so-called third receiving unit 309, and a so-called third sending unit 310.

First receiving unit 303 may for example be configured for being notified, by first PCRF 400, about a determination that there is no available data quota associated with first user terminal 500 for the data connectivity required for the service to be provided.

First sending unit 304 may for example be configured for notifying an ASP 200 about the determination.

Second receiving unit 307 may for example be configured for receiving, from the ASP 200, a message (here referred to as "first sponsoring message) comprising: (i) an identifier of a second user terminal 100 sponsoring the data connectivity of first user terminal 500; and (ii) an identifier of the service to which the sponsoring relates. The first sponsoring message may further comprise at least one of (a) an identifier of the first user terminal 500; and (b) information about the requested data amount to be sponsored.

Second sending unit 308 may for example be configured for sending, to a network node 600 hosting another PCRF (here referred to as second PCRF 600, in charge of a sponsoring user terminal, i.e., UE2), another message (here referred to as "second sponsoring message") comprising an identifier of the sponsored service to which the sponsoring relates. The second sponsoring message may further comprise at least one of (a) an identifier of the first user terminal 500 and (b) information about the requested data amount to be sponsored.

Third receiving unit 309 may for example be configured for receiving, from the second PCRF 600, another message (here referred to as "third sponsoring message") comprising the sponsored data amount.

Third sending unit 310 may for example be configured for sending, to the first PCRF 400, another message (here referred to as "fourth sponsoring message") comprising: (i) an identifier of the second user terminal 100 sponsoring the data connectivity of the first user terminal 500; (ii) an identifier of the sponsored service; and (iii) the sponsored data amount.

Figure 13:
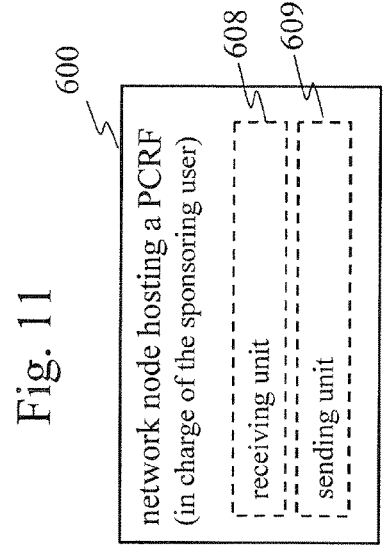
FIG. 13 schematically illustrates a network node hosting a PCRF in one embodiment of the invention, wherein the PCRF is in charge of a second user terminal, i.e. a sponsoring user terminal.

FIG. 13 schematically illustrates, as one embodiment of the invention, a network node 600 hosting a second PCRF (in charge of deciding the PCC rules for the sponsoring user) for participating in providing a service requiring data connectivity between at least two user terminals 100, 500. The network node illustrated on FIG. 13 may for example be implemented as illustrated on FIG. 10.

Network node 600 hosts a PCRF and may comprise a so-called receiving unit 608, and a so-called sending unit 609.

Receiving unit 608 may for example be configured for receiving, from a network node 300 hosting an AF, a so-called second sponsoring message comprising an identifier of a sponsored service to which a sponsoring relates. The second sponsoring message may further comprise at least one of (a) an identifier of the first user terminal 500; and (b) information about a requested data amount to be sponsored.

Sending unit 609 may for example be configured for sending, to the network node 300 hosting the AF, a so-called third sponsoring message comprising a sponsored data amount.

In one embodiment, a network node hosting a PCRF is provided which includes the units of both network nodes 400 and 600 as described above. Namely, a common PCRF node may be used for both the sponsored user and the sponsoring user.

Figure 14:
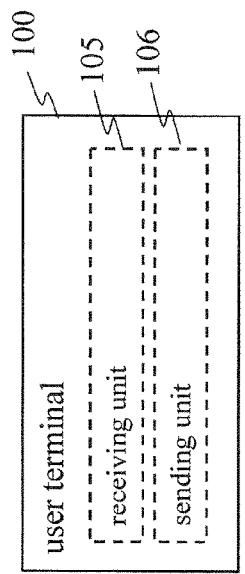
FIG. 14 schematically illustrates a user terminal in accordance with one embodiment of the invention.

FIG. 14 schematically illustrates, as one embodiment of the invention, a user terminal 100 (especially highlighting the functions of the sponsoring user's UE). The user terminal illustrated on FIG. 14 may for example be implemented as illustrated on FIG. 10.

User terminal 100, hereinafter referred to as "second user terminal" 100 (sponsoring user terminal) participates in providing a service requiring data connectivity between second user terminal 100 and at least one other user terminal, here referred to as "the at least one peer user terminal". Second user terminal 100 comprises a so-called receiving unit 105 and a so-called sending unit 106.

Receiving unit 105 may for example be configured for receiving, from an ASP 200, a request to sponsor the data connectivity of a first user terminal 500, so as to permit the data connectivity required for the service to be provided.

Sending unit 106 may for example be configured for indicating, to ASP 200, that second user terminal 100 agrees to sponsor the data connectivity of first user terminal 500 so as to permit the data connectivity required for the service to be provided. When doing so, it may be indicated, in one embodiment, that second user terminal 100 agrees to sponsor, up to a specified data amount, the data connectivity of first user terminal 500.

Where the terms "determining unit", "notifying unit", "receiving unit", "sending unit", "first receiving unit" etc. are used herewith, no restriction is made regarding how distributed these elements may be and regarding how gathered elements may be, That is, the constituent elements of a unit, function or network node may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned determining unit, notifying unit, receiving unit, sending unit, first receiving unit, etc. is replaced by determining means, notifying means, receiving means, sending means, first receiving means, etc. respectively, for performing the functions of the determining unit, notifying unit, receiving unit, sending unit, first receiving unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

ABBREVIATIONS

AAR Authentication-Authorization-Request
AF Application function
APN Access Point Name
ASA Abort Session Answer
ASP Application service provider
ASR Abort Session Request
AVP Attribute-value pair
BBERF Bearer, binding and event reporting function
CCR Credit-Control-Request
DRA Diameter Routing Agent
E-UTRAN Evolved UMTS Terrestrial Radio Access Network
GBR Guaranteed bit rate
GERAN GSM EDGE Radio Access Network
GGSN Gateway GPRS Support Node
GPRS General Packet Radio Service
GSM Global System for Mobile Communications
GTP GPRS Tunnelling Protocol
EDGE Enhanced Data Rates for GSM Evolution
EPS Evolved Packet System
IM CN IP Multimedia core network
IMS IP Multimedia Subsystem
IMSI International mobile subscriber identity
IP Internet Protocol
IP-CAN IP Connectivity Access Network
LTE Long-Term Evolution
PCC Policy and charging control
PCEF Policy and charging enforcement function
PCRF Policy and charging rules function
OCS Online charging system
OFCS Offline charging system
OTT Over-the-top (services)
P-CSCF Proxy Call Session Control Function
PDG Packet Data Gateway
PDN Packet Data Network
PGW PDN Gateway
PMIP Proxy Mobile IPv6
QCI QoS class identifier
QoS Quality of service
RAN Radio access network RAR Re-Auth-Request
SOAP Simple Object Access Protocol
SPR Subscription profile repository
STA Session Termination Answer
STR Session Termination Request
UE User equipment
UMTS Universal Mobile Telecommunications System
UTRAN Universal Terrestrial Radio Access Network
WLAN Wireless local area network

The invention claimed is:

1. A method of providing a service requiring data connectivity between at least two user terminals, the method comprising:
   determining, by a network node hosting a policy and charging rules function, said network node being hereinafter referred to as "first PCRF", that there is no available data quota associated with one of the at least two user terminals, said user terminal being hereinafter referred to as "first user terminal", for the data connectivity required for the service to be provided;
   upon determining that there is no available data quota associated with the first user terminal for the data connectivity required for the service to be provided:
      notifying, by the first PCRF, a network node hosting an application function, said network node being hereinafter referred to as "AF", about the determination that there is no available data quota associated with the first user terminal;
      notifying, by the AF, an application service provider, about the determination that there is no available data quota associated with the first user terminal; and
      requesting, by the application service provider, to another one of the at least two user terminals, said other user terminal being hereinafter referred to as "second user terminal", to sponsor the data connectivity of the first user terminal so as to permit the data connectivity required for the service to be provided;
      indicating, by the second user terminal to the application service provider, that the second user terminal agrees to sponsor the data connectivity of the first user terminal so as to permit the data connectivity required for the service to be provided;
   sending, by the application service provider, to the AF, a message, hereinafter referred to as "first sponsoring message", comprising:
      an identifier of the second user terminal sponsoring the data connectivity of the first user terminal; and
      an identifier of the service to which the sponsoring relates;
   sending, by the AF, to the first PCRF, another message, hereinafter referred to as "fourth sponsoring message", comprising:
      the identifier of the second user terminal sponsoring the data connectivity of the first user terminal; and
      the identifier of the service to which the sponsoring relates; and
   providing the service between at least the first user terminal and the second user terminal.

2. Method of claim 1, wherein the step of indicating, by the second user terminal, to the application service provider, that the second user terminal agrees to sponsor the data connectivity of the first user terminal so as to permit the data connectivity required for the service to be provided comprises:
   indicating, by the second user terminal, to the application service provider, that the second user terminal agrees to sponsor, up to a specified data amount, the data connectivity of the first user terminal.

3. Method of claim 1, wherein the first sponsoring message further comprises at least one of
   an identifier of the first user terminal; and
   information about the requested data amount to be sponsored.

4. Method of claim 1, the method further comprising, after sending, by the application service provider, to the AF, the first sponsoring message,
   sending, by the AF, to a network node hosting another policy and charging rules function, said network node being hereinafter referred to as "second PCRF", another message, hereinafter referred to as "second sponsoring message", comprising an identifier of the service to which the sponsoring relates;
   sending, by the second PCRF to the AF, another message, hereinafter referred to as "third sponsoring message", comprising the sponsored data amount; and
   wherein the fourth sponsoring message comprises the sponsored data amount.

5. Method of claim 4, wherein the second sponsoring message further comprises at least one of
   an identifier of the first user terminal; and
   information about the requested data amount to be sponsored.

6. Method of claim 1, the method further comprising:
   monitoring the amount of data transferred between the first user terminal and a packet-switched network in the context of providing the service; and
   taking into account the monitored amount of data transferred between the first user terminal and the packet-switched network as if the amount of data had been transferred between the second user terminal and the packet-switched network.

7. A network node operable to host a first policy and charging rules function and to participate in providing a service requiring data connectivity between at least two user terminals, the network node comprising a processor and a memory, the processor operable to:
   determine that there is no available data quota associated with one of the at least two user terminals, said user terminal being hereinafter referred to as "first user terminal", for the data connectivity required for the service to be provided;
   upon determining that there is no available data quota associated with the first user terminal for the data connectivity required for the service to be provided, the processor is operable to:
      notify another network node hosting an application function, said network node being hereinafter referred to as "AF", about the determination that there is no available data quota associated with the first user terminal; and
      receive, from the AF, a message comprising:
         an identifier of another one of the at least two user terminals, said other user terminal being hereinafter referred to as "second user terminal", the second user terminal sponsoring the data connectivity of the first user terminal;
         an identifier of the service to which the sponsoring relates; and
         a sponsored data amount.

8. A network node operable to host an application function and to participate in providing a service requiring data connectivity between at least two user terminals, the network node comprising a processor and a memory, the processor operable to:
- receive a notification, from a network node hosting a policy and charging rules function, said network node being hereinafter referred to as "first PCRF", about a determination that there is no available data quota associated with one of the at least two user terminals, said user terminal being hereinafter referred to as "first user terminal", for the data connectivity required for the service to be provided;
- upon receiving the notification about the determination that there is no available data quota associated with the first user terminal for the data connectivity required for the service to be provided, the processor is operable to:
  - notify an application service provider about the determination that there is no available data quota associated with the first user terminal;
  - receive, from the application service provider, a message, hereinafter referred to as "first sponsoring message", comprising:
    - an identifier of another one of the at least two user terminals, said other user terminal being hereinafter referred to as "second user terminal", the second user terminal sponsoring the data connectivity of the first user terminal; and
    - an identifier of the service to which the sponsoring relates;
  - send, to a network node hosting another policy and charging rules function associated with the second user terminal, said network node being hereinafter referred to as "second PCRF", another message, hereinafter referred to as "second sponsoring message", comprising an identifier of the service to which the sponsoring relates;
  - receive, from the second PCRF, another message, hereinafter referred to as "third sponsoring message", comprising a sponsored data amount; and
  - send, to the first PCRF, another message, hereinafter referred to as "fourth sponsoring message", comprising:
    - an identifier of the second user terminal sponsoring the data connectivity of the first user terminal;
    - an identifier of the service to which the sponsoring relates; and
    - the sponsored data amount.

9. Network node of claim 8, wherein the first sponsoring message further comprises at least one of:
- an identifier of the first user terminal; and
- information about the requested data amount to be sponsored.

10. Network node of claim 8, wherein the second sponsoring message further comprises at least one of:
- an identifier of the first user terminal; and
- information about the requested data amount to be sponsored.

11. A network node operable to host a second policy and charging rules function and to participate in providing a service requiring data connectivity between at least two user terminals, the network node comprising a processor and a memory, the processor operable to:
- receive, from a network node hosting an application function, a message, hereinafter referred to as "second sponsoring message", comprising:
  - an identifier of a service to which a sponsoring relates; and
  - an identifier of one of the at least two user terminals, said user terminal being hereinafter referred to as "first user terminal", wherein the second sponsoring message is received in response to a network node associated with the first user terminal, hereinafter referred to as "first PCRF", determining that there is no available data quota associated with the first user terminal for the data connectivity required for the service to be provided; and
- send, to the network node hosting the application function, another message, hereinafter referred to as "third sponsoring message", comprising a sponsored data amount.

12. Network node of claim 11, wherein the second sponsoring message further comprises:
- information about a requested data amount to be sponsored.

13. User terminal, hereinafter referred to as "second user terminal", for participating in providing a service requiring data connectivity between the second user terminal and at least one other user terminal, hereinafter referred to as "first user terminal", the second user terminal comprising a processor and a memory, the processor operable to:
- receive, from an application service provider, a request to sponsor the data connectivity of the first user terminal, so as to permit the data connectivity required for the service to be provided, wherein the request is received in response to a network node hosting a policy and charging rules function determining that there is no available data quota associated with the first user terminal for the data connectivity required for the service to be provided; and
- indicate, to the application service provider, that the second user terminal agrees to sponsor the data connectivity of the first user terminal so as to permit the data connectivity required for the service to be provided.

14. User terminal of claim 13, said user terminal being still here referred to as "second user terminal", wherein the processor is operable to:
- indicate, to the application service provider, that the second user terminal agrees to sponsor, up to a specified data amount, the data connectivity of the first user terminal.

15. A computing system comprising a memory, the memory comprising instructions executable by one or more processors, the one or more processors coupled to the memory and operable to execute the instructions, the one or more processors operable to, when executing the instructions, perform the steps of claim 1.

* * * * *